United States Patent
Tagami

(10) Patent No.: US 11,475,913 B2
(45) Date of Patent: Oct. 18, 2022

(54) MAGNETIC DISK DEVICE AND DEMODULATION METHOD FOR SERVO DATA

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Naoki Tagami, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/408,103

(22) Filed: Aug. 20, 2021

(65) Prior Publication Data

US 2022/0208225 A1    Jun. 30, 2022

(30) Foreign Application Priority Data

Dec. 24, 2020    (JP) .............................. JP2020-215386

(51) Int. Cl.
   *G11B 5/596*    (2006.01)
(52) U.S. Cl.
   CPC ...... *G11B 5/59655* (2013.01); *G11B 5/59688* (2013.01)
(58) Field of Classification Search
   None
   See application file for complete search history.

(56) References Cited

U.S. PATENT DOCUMENTS

| | | | | |
|---|---|---|---|---|
| 6,172,836 B1* | 1/2001 | Bang | .................. | G11B 5/59622 360/75 |
| 9,013,824 B1* | 4/2015 | Guo | .................... | G11B 5/59655 360/75 |
| 9,257,135 B2* | 2/2016 | Ong | .................. | G11B 20/10009 |
| 9,761,258 B2 | 9/2017 | Haapala et al. | | |
| 9,792,939 B2 | 10/2017 | Mendonsa et al. | | |
| 10,360,930 B1* | 7/2019 | Asakura | ............. | G11B 5/59655 |
| 10,748,569 B1 | 8/2020 | Ogawa et al. | | |

(Continued)

FOREIGN PATENT DOCUMENTS

| | | |
|---|---|---|
| JP | 2019-133730 A | 8/2019 |
| JP | 2020-91931 A | 6/2020 |

(Continued)

*Primary Examiner* — K. Wong
(74) *Attorney, Agent, or Firm* — Allen & Overy LLP

(57) ABSTRACT

According to one embodiment, a magnetic disk device includes a disk having first servo data including a first preamble, a first servo mark, a first gray code, first burst data, and second burst data written after the first burst data, a head including a write head that writes data to the disk and a first read head and a second read head that read data from the disk, and a controller that reads the second burst data using the first read head and the second read head and calculates a servo demodulation position when the first servo data is servo-read without reading the first burst data in a short servo mode in which the first preamble, the first servo mark, and the first gray code are not read.

24 Claims, 21 Drawing Sheets

(56) References Cited

U.S. PATENT DOCUMENTS

| | | |
|---|---|---|
| 10,872,631 B1 | 12/2020 | Tagami et al. |
| 2019/0237098 A1 | 8/2019 | Asakura et al. |
| 2020/0185004 A1 | 6/2020 | Tagami et al. |
| 2020/0286517 A1 | 9/2020 | Tagami |
| 2021/0027805 A1 | 1/2021 | Asakura et al. |
| 2021/0264942 A1 | 8/2021 | Tagami |

FOREIGN PATENT DOCUMENTS

| | | |
|---|---|---|
| JP | 2020-144965 A | 9/2020 |
| JP | 2020-155172 A | 9/2020 |
| JP | 2021-44030 A | 3/2021 |
| JP | 2021-131920 A | 9/2021 |

* cited by examiner

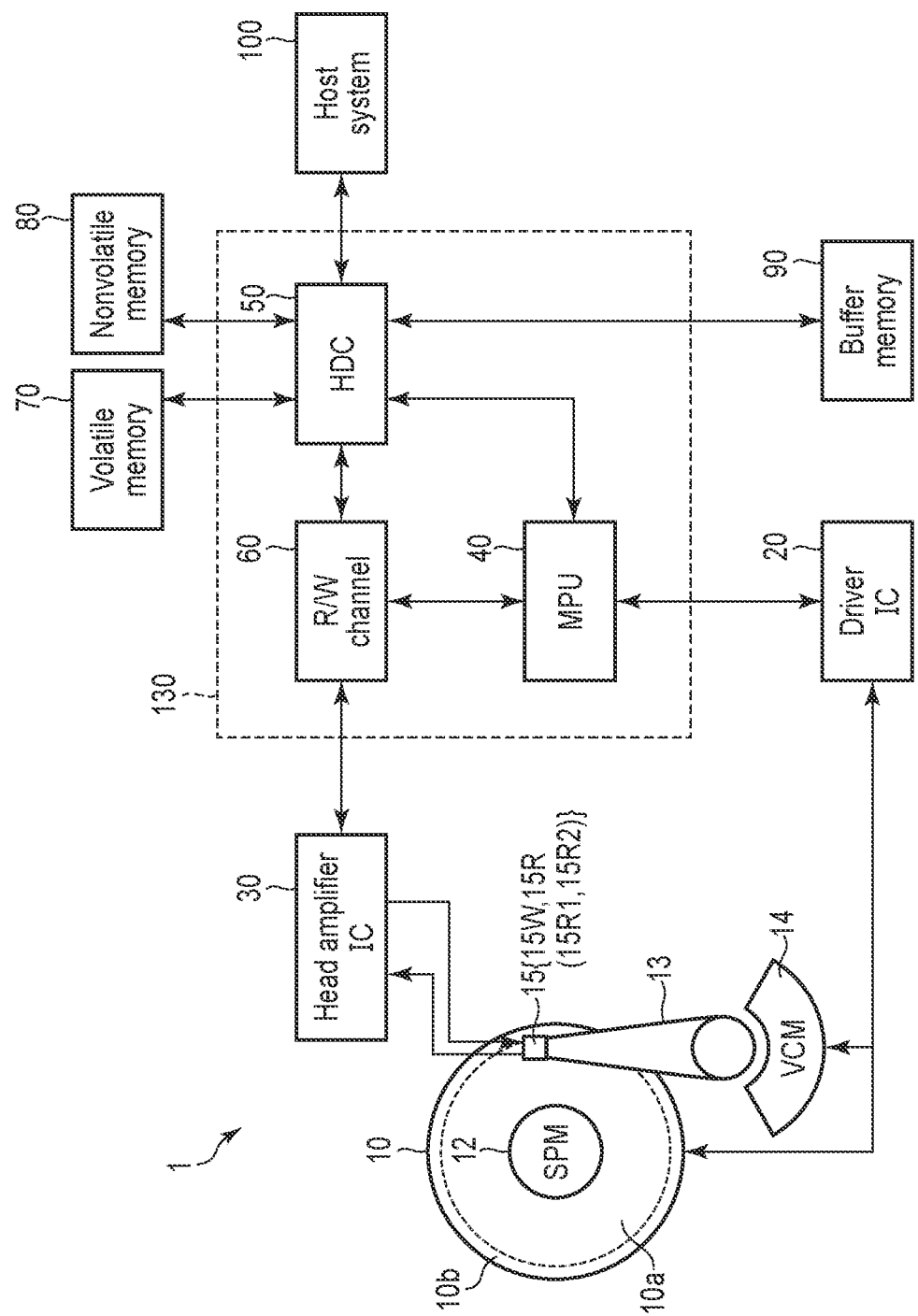
F I G. 1

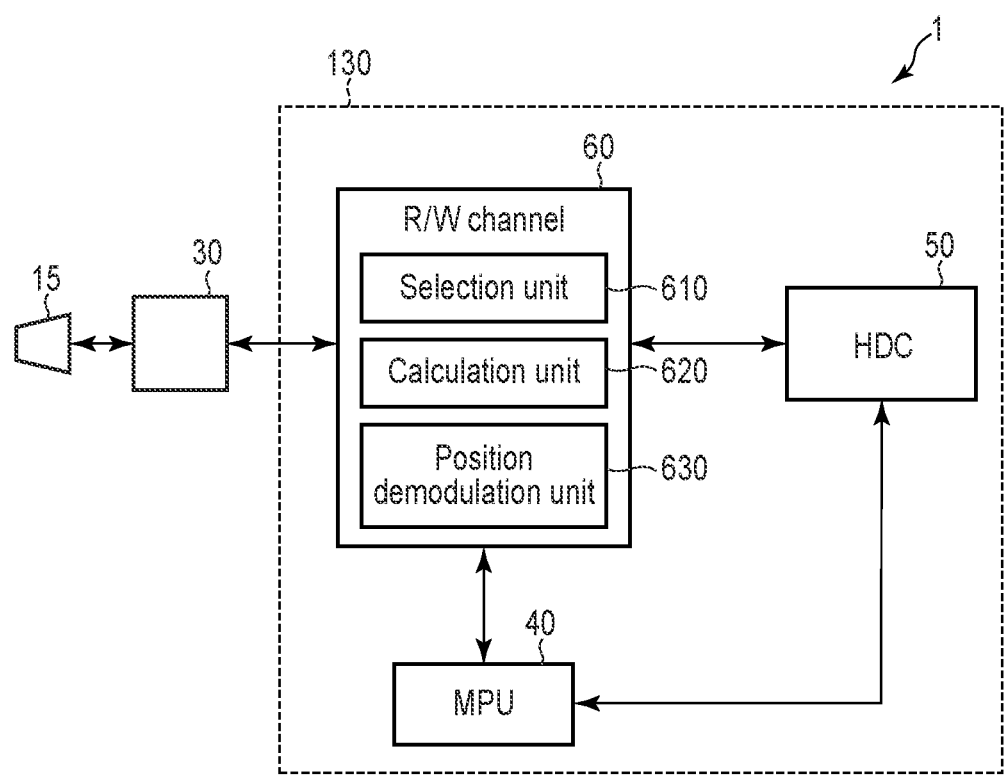
F I G. 7

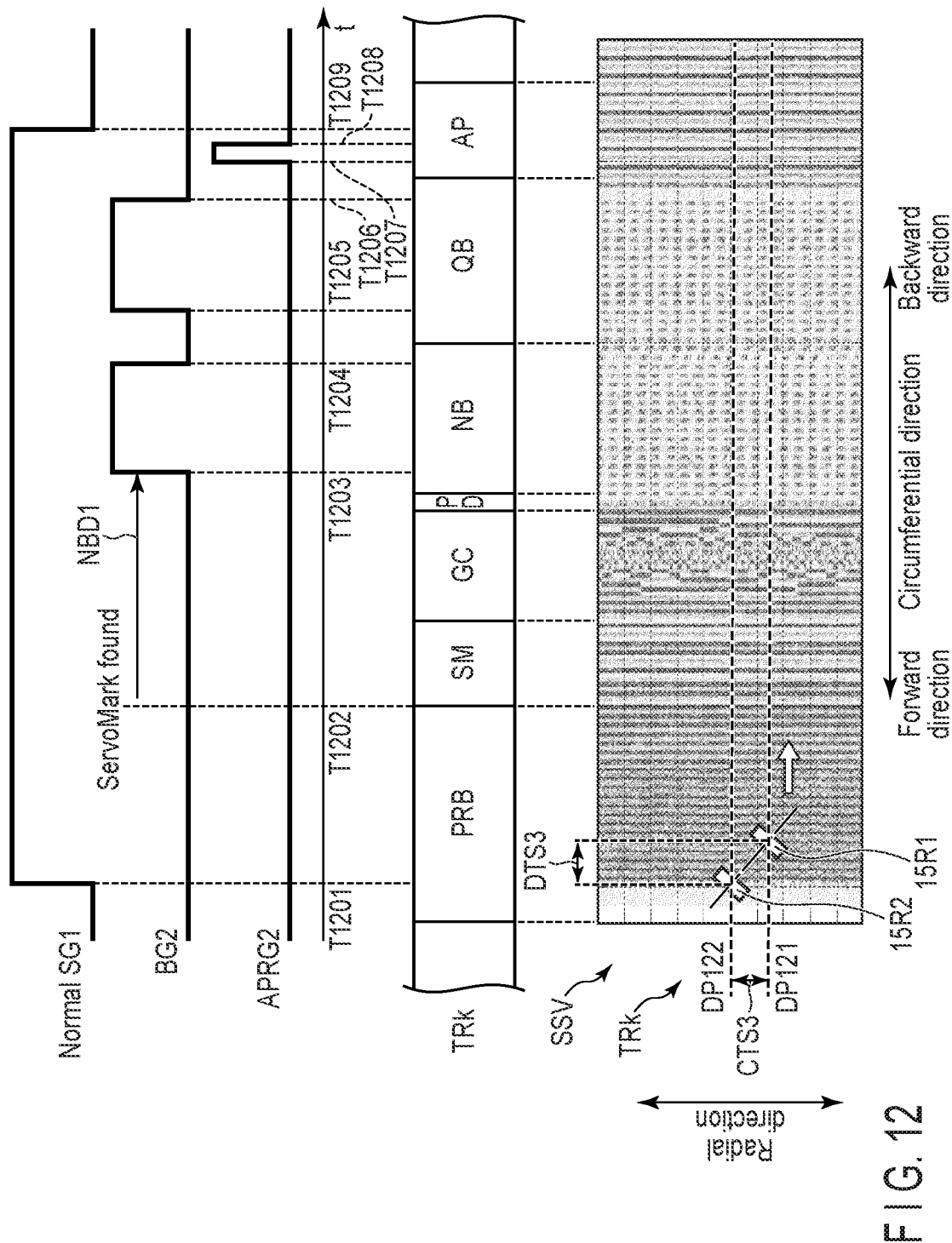
F I G. 12

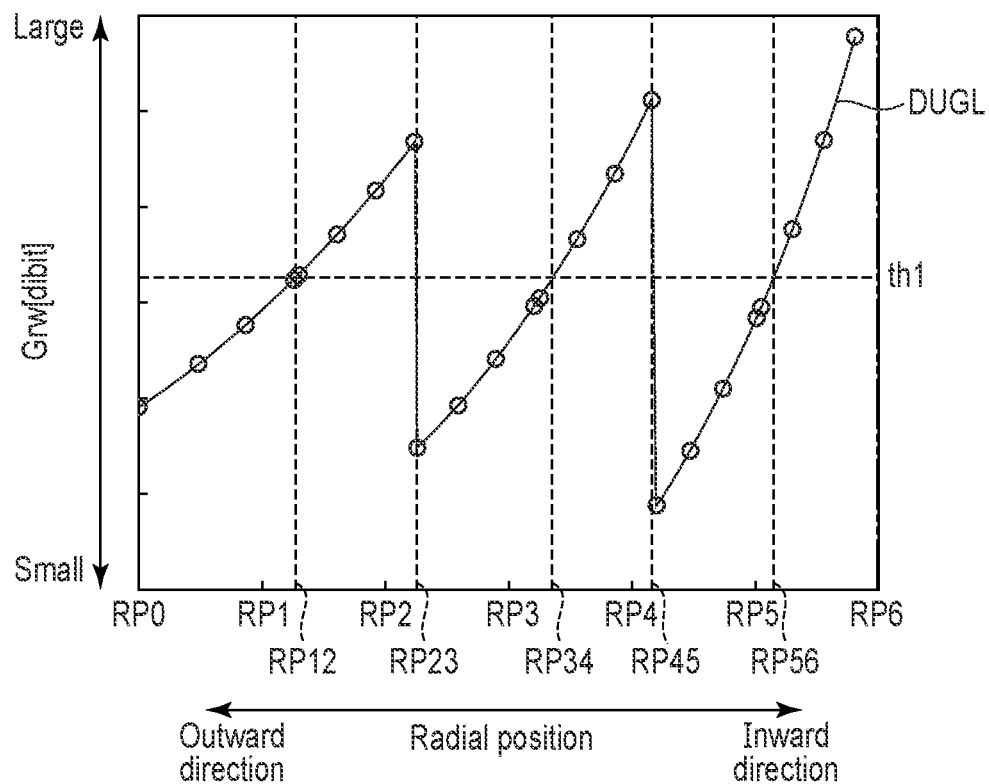
F I G. 15
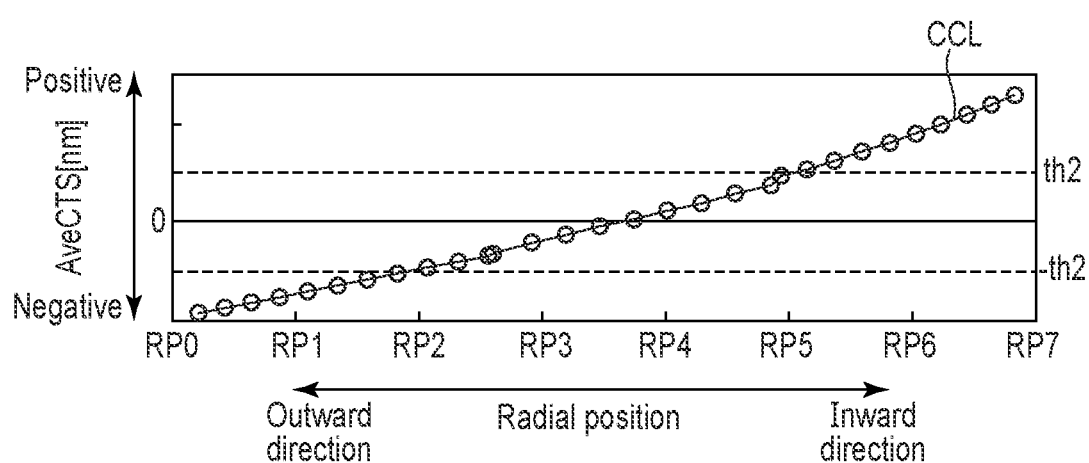
F I G. 16

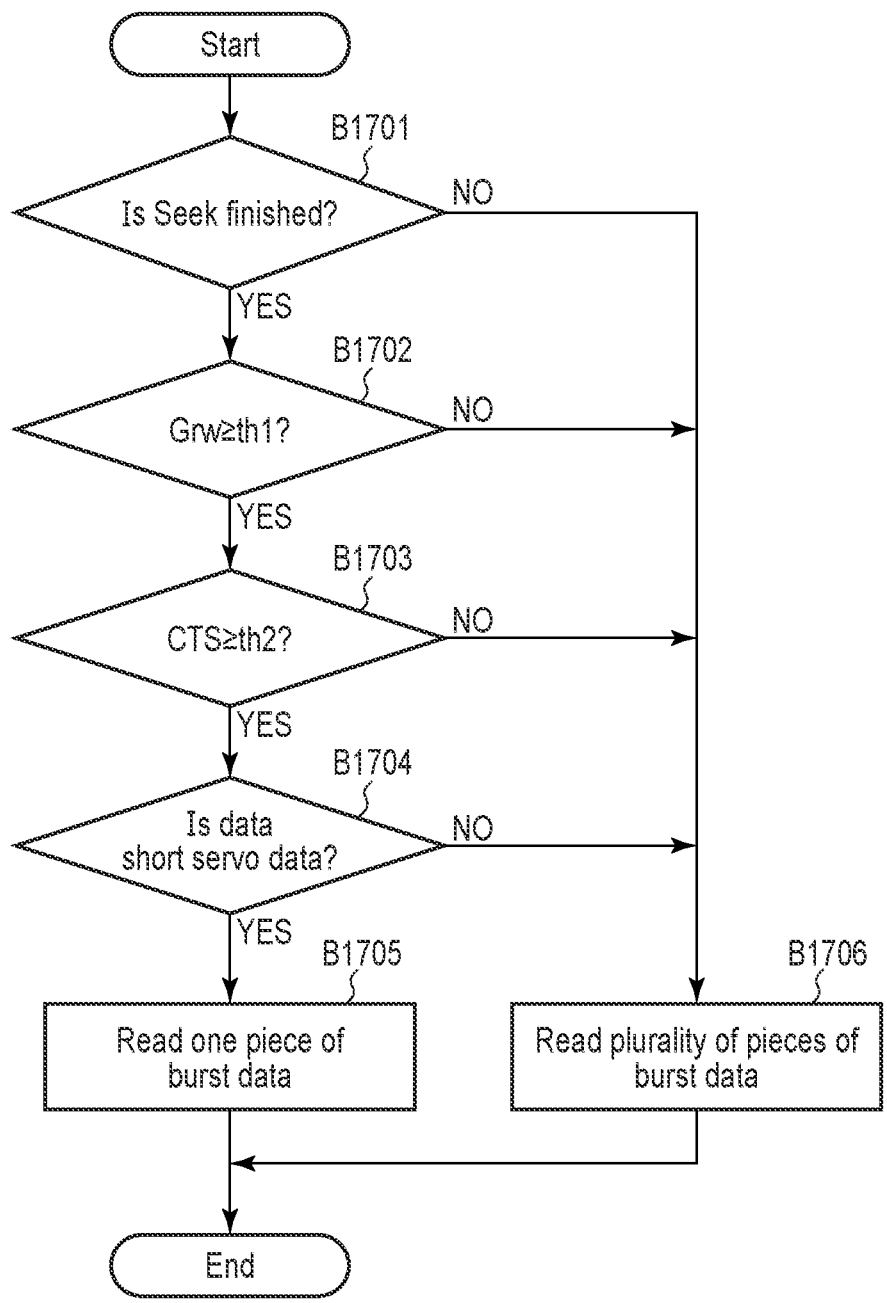
F I G. 17

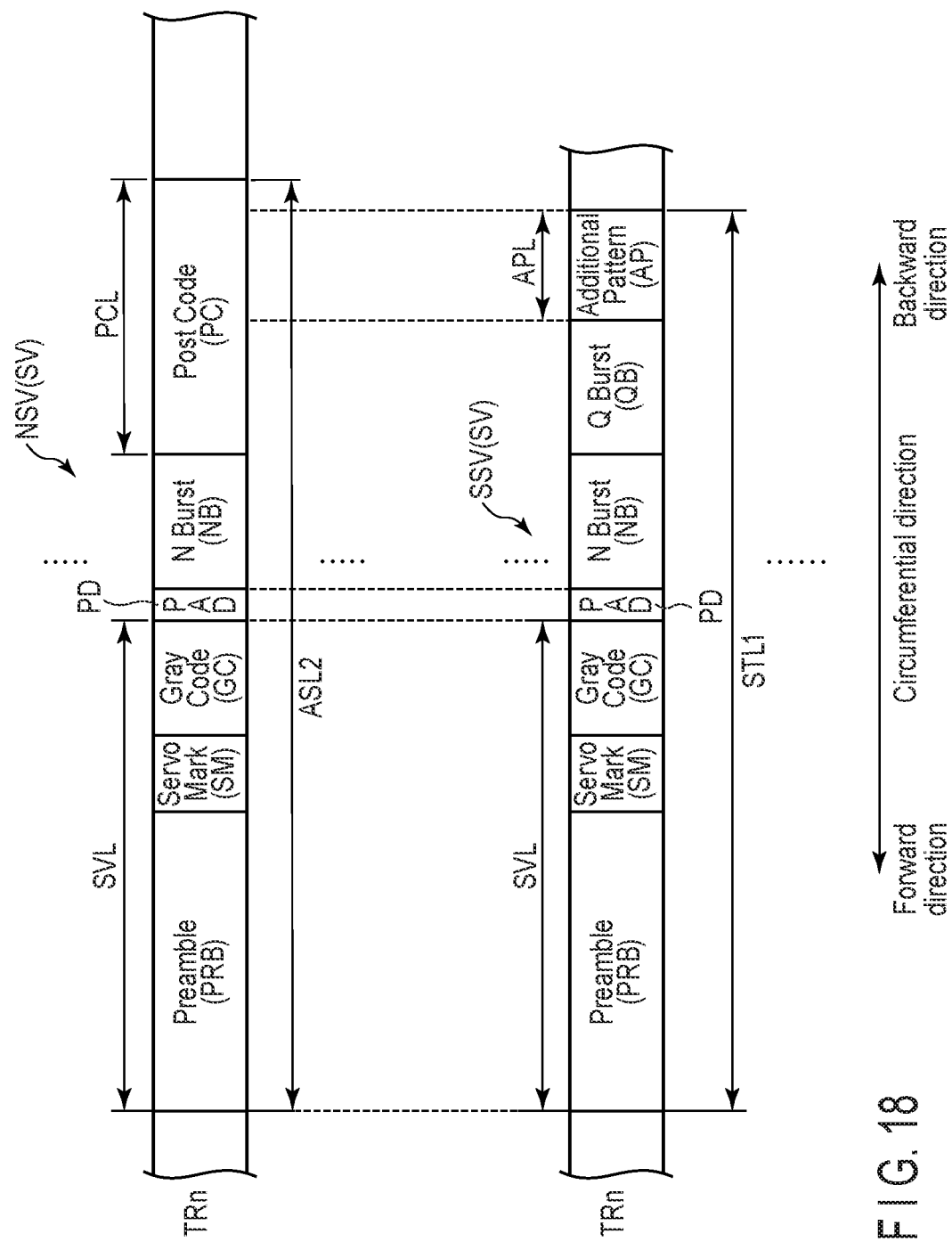
F I G. 18

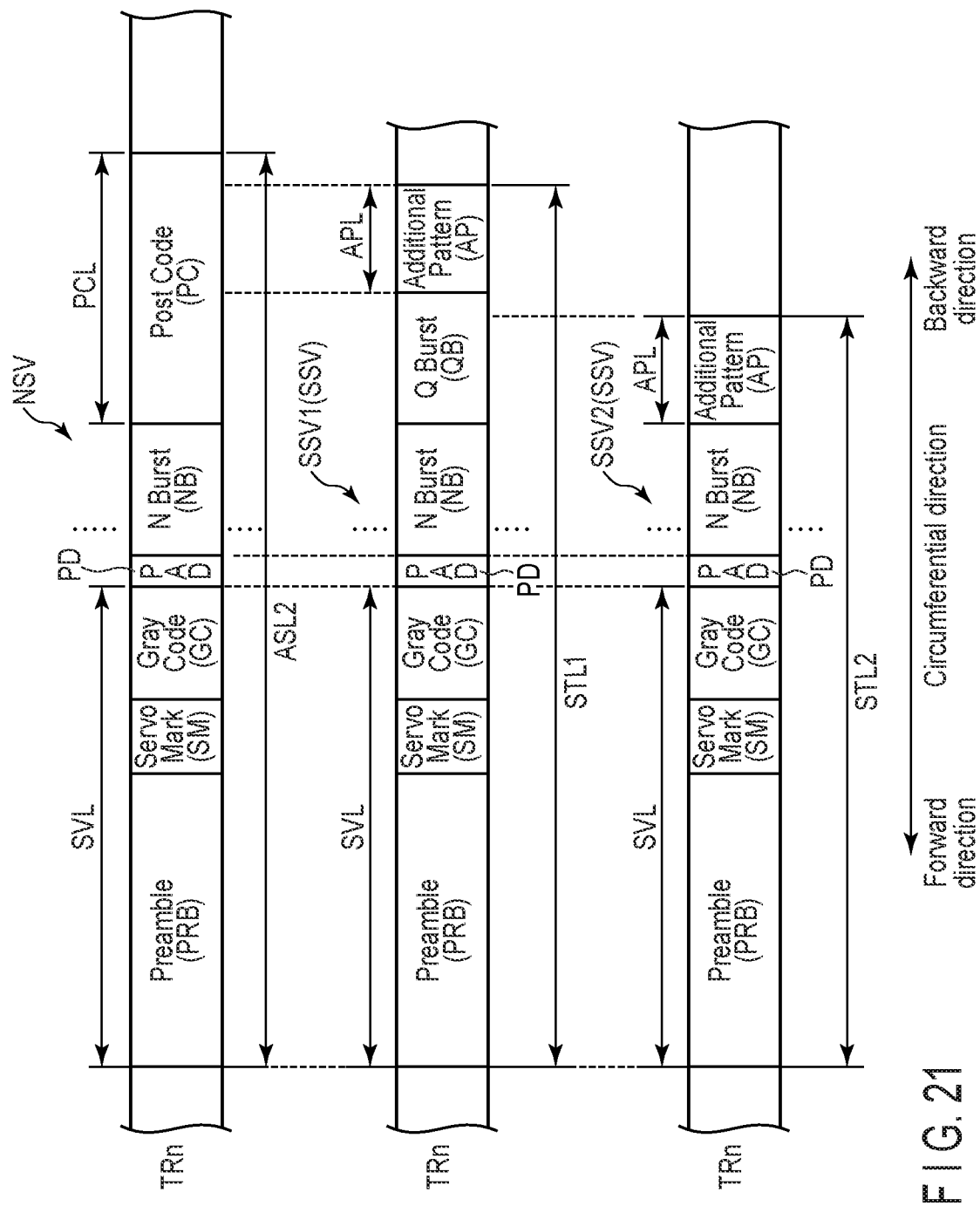
F I G. 21

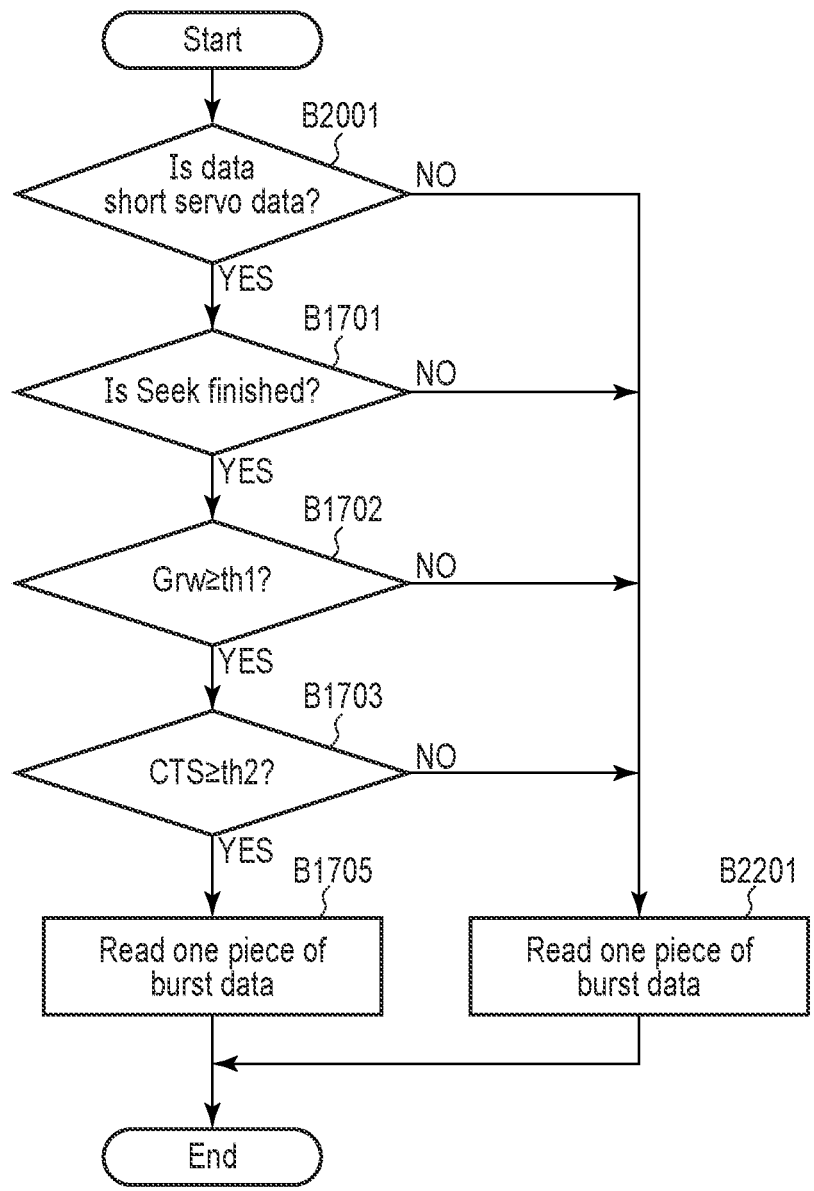
F I G. 22

MAGNETIC DISK DEVICE AND DEMODULATION METHOD FOR SERVO DATA

CROSS-REFERENCE TO RELATED APPLICATIONS

This application is based upon and claims the benefit of priority from Japanese Patent Application No. 2020-215386, filed Dec. 24, 2020, the entire contents of which are incorporated herein by reference.

FIELD

Embodiments described herein relate generally to a magnetic disk device and a demodulation method for servo data.

BACKGROUND

Techniques are developed by which the data format efficiency of a magnetic disk (in the following, simply referred to a disk) is improved to increase a data writable region. As techniques of improving the data format efficiency and increasing the data writable region, there are a read processing technique (short servo mode) of reading a servo sector with a length in the circumferential direction of a disk shorter than a length in the circumferential direction of the disk of the servo sector read in normal read processing, a technique of permitting the read processing of the servo sector while data is written to the disk, and any other technique. A magnetic disk having a read processing technique of reading servo sectors in a short servo mode, burst data alone is read to position a head, and write processing and read processing are executed without reading servo data such as a preamble, a servo mark, a gray code, and a post code in some servo sectors in a plurality of servo sectors arranged in the circumferential direction of the disk. In a magnetic disk device having a technology of permitting a read process of a servo sector while data is written to a disk, a read process of a servo sector is permitted while data is written to the disk, and a read process of a part of servo data such as a preamble, a servo mark, a gray code, and a post code is executed before the write process is stopped.

In recent years, a two-dimensional magnetic recording (TDMR) type magnetic disk device having a plurality of read heads has been developed. In a TDMR type magnetic disk device, an interval (cross track separation: CTS) in a direction intersecting with tracks of a plurality of read heads changes according to a skew angle of a head. Therefore, in the TDMR type magnetic disk device, it is necessary to appropriately position a head for reading data written on a disk.

BRIEF DESCRIPTION OF THE DRAWINGS

FIG. 1 is a block diagram illustrating the configuration of a magnetic disk device according to a first embodiment.
FIG. 7 is a block diagram illustrating an example configuration of art R/W channel according to the first embodiment.
FIG. 12 is a schematic diagram illustrating an example of various gate and head arrangements for reading N-burst data and Q-burst data in Seek.
FIG. 15 is a diagram illustrating a change in a read/write gap converted into a dibit length to a radial position.
FIG. 16 is a diagram illustrating a change in a cross track separation to a radial position.
FIG. 17 is a flowchart illustrating an example of a demodulation method for servo data according to the first embodiment.
FIG. 18 is a schematic diagram illustrating an example of configurations of normal servo data and short serve data according to a second embodiment.
FIG. 21 is a schematic diagram illustrating an example of configurations of normal servo data and short servo data according to a second modification.
FIG. 22 is a flowchart illustrating an example of. a demodulation method for servo data according to the second modification.

DETAILED DESCRIPTION

Figure 2:
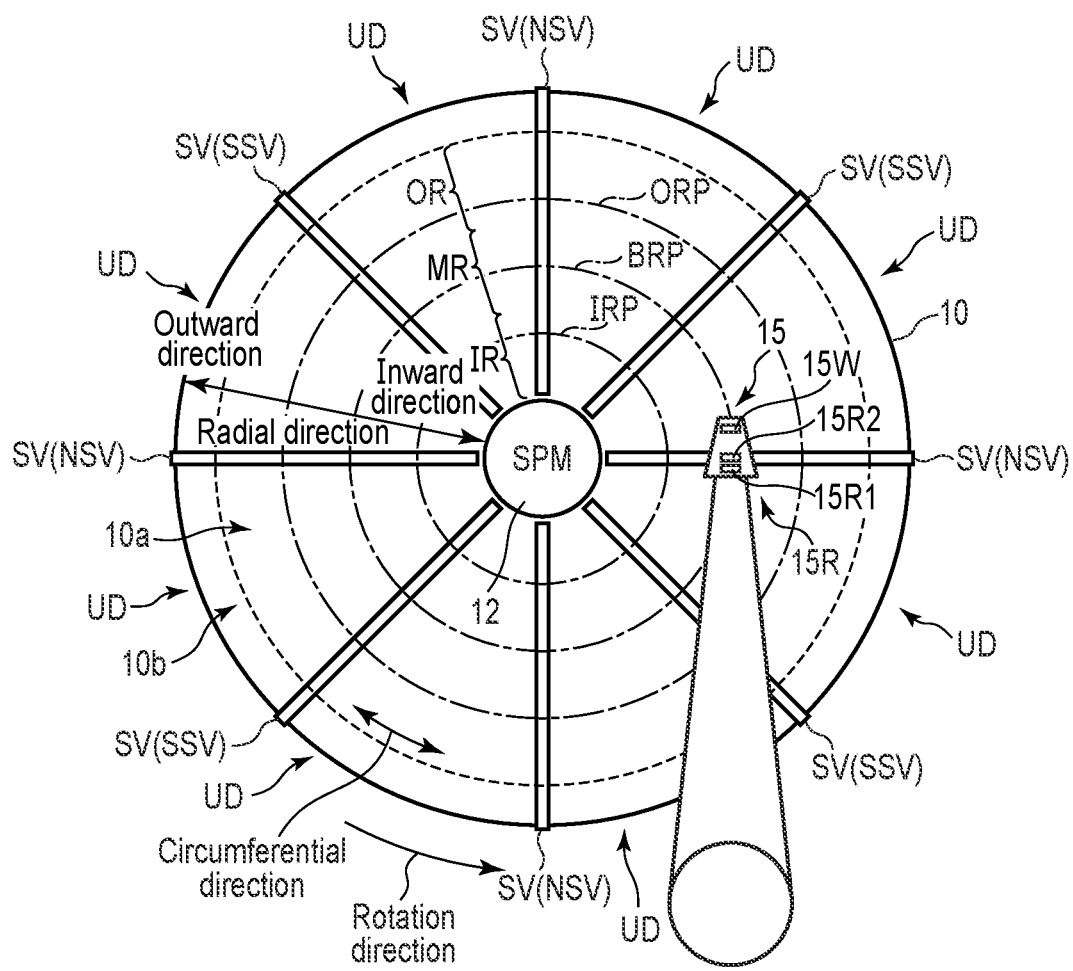
FIG. 2 is a schematic diagram illustrating an example of an arrangement of a head to a disk according to the first embodiment.

In general, according to one embodiment, a magnetic disk device comprises: a disk having first servo data including a first preamble, a first servo mark, a first gray code, first burst data, and second burst data written after the first burst data; a head including a write head that writes data to the disk and a first read head and a second read head that read data from the disk; and a controller that reads the second burst data using the first read head and the second read head and calculates a servo demodulation position when the first servo data is servo-read without reading the first burst data in a short servo mode in which the first preamble, the first servo mark, and the first gray code are not read.

In the following, embodiments will be described with reference to the drawings. It should be noted that the drawings are merely examples, and do not limit the scope of the invention.

First Embodiment

FIG. 1 is a block diagram illustrating the configuration of a magnetic disk device 1 according to a first embodiment.

The magnetic disk device 1 includes a head disk assembly (HDA) described later, a driver IC 20, a head amplifier integrated circuit (in the following, a head amplifier IC or a preamplifier) 30, a volatile memory 70, a nonvolatile memory 80, a buffer memory (buffer) 90, and a system controller 130 that is a one-chip integrated circuit. The magnetic disk device 1 is connected to a host system (host) 100. The magnetic disk device 1 is a two-dimensional magnetic recording (TDMR) magnetic disk device, for example.

The HDA includes a magnetic disk (in the following, the disk may be referred to as a disk) 10, a spindle motor (SPM) 12, an arm 13 on which a head 15 is mounted, and a voice coil motor (VCM) 14. The disk 10 is attached to the spindle motor 12 and rotates by drive of the spindle motor 12. The arm 13 and the VCM 14 constitute an actuator. The actuator controls the movement of the head 15 mounted on the arm 13 to a particular position of the disk 10 by drive of the VCM 14. Two or more numbers of the disks 10 and the heads 15 may be provided.

In the disk 10, a user data region 10a available for a user and a system area 10b in which information necessary for system management is recorded are allocated in a region in which data is writable. It should be noted that, a media cache (may be referred to as a media cache region) that temporarily holds data (or a command) transferred from the host 100 or the like before being written to a particular region of the user data region 10a may be allocated to the disk 10 as another region from the user data region 10a and the system area 10b. In the following, a direction from the inner circumference to the outer circumference of the disk 10 or a direction from the outer circumference to the inner circumference of the disk 10 is referred to as a radial direction. A direction orthogonal to the radial direction of the disk 10 is referred to as a circumferential direction. That is, the circumferential direction corresponds to a direction along the circumference of the disk 10. A particular position in the radial direction of the disk 10 may be referred to as a radial position, and a particular position in the circumferential direction of the disk 10 may be referred to as a circumferential position. The radial position and the circumferential position are sometimes simply referred to as a position. The disk 10 is divided into a plurality of regions (in the following, sometimes referred to as a zone or a zone region) for each particular range in the radial direction. The zone may include a plurality of tracks arranged in a radial direction. The track may include a plurality of sectors arranged in a circumferential direction. It should be noted that the term "track" is used as one region among a plurality of regions obtained by dividing the disk 10 for each particular range in the radial direction, a path of the head 15 corresponding to a particular radial position of the disk 10, data extending in the circumferential direction in a particular radial direction of the disk 10, data for one cycle written in a particular track of the disk 10, data written in a particular track of the disk 10, and various other meanings. The term "sector" is used as one region among a plurality of regions obtained by dividing a particular track of the disk 10 in the circumferential direction, data written at a particular circumferential position at a particular radial position of the disk 10, data written in a particular sector of the disk 10, or various other meanings. The term "radial width of the track" may be referred to as "track width". The term "radial width of the sector" may be referred to as a "sector width".

The head 15 includes a write head 15W and a read head 15R mounted on a slider as a main body. The write head 15W writes data to the disk 10. The read head 15R reads data recorded on the disk 10. The read head 15R includes a plurality of read heads two read heads 15R1 and 15R2, for example. The road head 15R1 is provided at a position the farthest from the write head 15W, for example. The read head 15R2 is provided at a position next, to the read head 15R3 the second farthest from the write head 15W, for example. In other words, the read head 15R2 is located between the write head 15W and the lead head 15R1. It should be noted that the read head 15R may have three or more read heads. In the following, the plurality of read heads, for example, the two read heads 15R1 and 15R2 may be collectively referred to as a read head 15R, or any one of the plurality of read heads, for example, the read heads 15R1 and 15R2 may be simply referred to as a read head 15R.

FIG. 2 is a schematic diagram illustrating an example of the arrangement of the head 15 to the disk 10 according to the present embodiment. As illustrated in FIG. 2, a direction toward the outer circumference of the disk 10 in the radial direction is referred to as an outward direction (outer side), and a direction opposite to the outward direction is referred to as an inward direction (inner side). As illustrated in FIG. 2, in the circumferential direction, a direction in which the disk 10 rotates is referred to as a rotation direction. In the example illustrated in FIG. 2, although the rotation direction is illustrated in the clockwise direction, the rotation direction may be the opposite direction (counterclockwise). In FIG. 2, the user data region 10a is divided into an inner circumferential region TR located in the inward direction, an outer circumferential region OR located in the outward direction, and a middle circumferential region MR located between the inner circumferential region IR and the outer circumferential region OR. In the example illustrated in FIG. 2, a radial position IRP, a radial position BRP, and a radial position ORP are illustrated. The radial position IRP is a position inward from the radial position BRP, and the radial position ORP is a position outward from the radial position BRP. In the example illustrated in FIG. 2, the radial position BRP is included in the middle circumferential region MR, the radial position ORP is included in the outer circumferential region OR, and the radial position IRP is included in the inner circumferential region IR. It should be noted that the radial position BRP may be Included in the outer circumferential region OR or may be included in the inner circumferential region IR. The radial positions IRP and ORP may be included in the middle circumferential region MR.

The disk 10 has a plurality of servo regions SV and a plurality of data regions UD. For example, the plurality of servo regions SV may extend radially in the radial direction of the disk 10, and may be discretely disposed at particular intervals in the circumferential direction. For example, the plurality of servo regions SV may extend spirally from the inner circumference to the outer circumference, and may be discretely disposed at particular intervals in the circumferential direction. Furthermore, for example, the plurality of servo regions SV may be disposed in an island shape in the radial direction and discretely disposed with particular intervals changed in the circumferential direction. In the case in which the servo regions are disposed in an island shape in the radial direction, the servo frequencies of the island-shaped servo region may increase from the inner circumference to the outer circumference (zone servo format). In the following, one servo region SV in a particular track may be referred to as a "servo sector". It should be noted that the "servo region SV" may be referred to as a "servo sector SV". The servo sector includes servo data. A data pattern constituting the servo data may be referred to as a servo pattern. It should be noted that the "servo sector" and the "servo data written in the servo sector" may be referred to as "servo data SV", "servo sector SV", or "servo pattern SV".

The plurality of data regions UD is individually disposed between the plurality of servo regions SV in the user data region 10a. For example, the data region UD corresponds to a region between two continuous servo regions SV in the circumferential direction. In the following, one data region UD in a particular track may be referred to as a "data sector". It should be noted that the term "data region UD" may be referred to as a "data sector UD". The data sector includes user data. The data pattern constituting the user data may be referred to as a user data pattern. It should be noted that the "data sector" and the "user data" written in the data sector may be referred to as "user data UD", "the data sector UD", or "a user data pattern UD".

The servo region SV includes, for example, a servo region (in the following, referred to as a normal servo region) NSV and a servo region (in the following, referred to as a short servo region) SSV different from the servo region NSV. In the following, one normal servo region NSV in a particular track may be referred to as a "normal servo sector", and one short servo region SSV in a particular track may be referred to as a "short servo sector SSV". The normal servo sector includes normal servo data or servo data, and the short servo data includes short, servo data or serve data different from that of the normal servo sector. It should be noted that the "normal servo sector" and the "normal servo data or servo data written in the normal servo sector" may be referred to as "servo data NSV", "normal servo data NSV", "a servo sector NSV", or "a normal servo sector NSV". It should be noted that the "short servo sector" and the "short servo data or servo data written in the short servo sector" may be referred to as "servo data SSV", "short servo data SSV", "the servo sector SSV", or "the short servo sector SSV". The normal servo data NSV may be the same as or different from the short servo data SSV. Terms such as "the same", "identical", "matching", and "equivalent" include not only the meaning of being exactly the same but also the meaning of being different to such an extent that they can be regarded as being substantially the same. For example, the circumferential length of the short servo data SSV is shorter than the circumferential length of the normal servo data NSV. In the following, the "circumferential length" is simply referred to as "length". It should be noted that the length of the short servo data SSV may be, for example, the same as or longer than the length of the normal servo data NSV.

In the example illustrated in FIG. 2, the normal servo data NSV and the short servo data SSV are alternately disposed in the circumferential direction. In other words, one piece of short servo data SSV is disposed between two pieces of normal servo data NSV arranged continuously at intervals in the circumferential direction. For example, in the case in which consecutive numbers are sequentially allocated to all the servo regions SV of the disk 10, the normal servo data NSV corresponds to the odd-numbered servo data SV, and the short servo data SSV corresponds to the even-numbered servo data SV. It should be noted that two or more pieces of short servo data SSV may be disposed between two pieces of normal servo data NSV arranged continuously at intervals in the circumferential direction.

In the example illustrated in FIG. 2, the head 15 is disposed at the radial position BRP. In the case in which the head 15 is located at the radial position BRP, the skew angle is, for example, 0°. In the following, the radial position BRP may be referred to as a reference position BRP.

Figure 3:
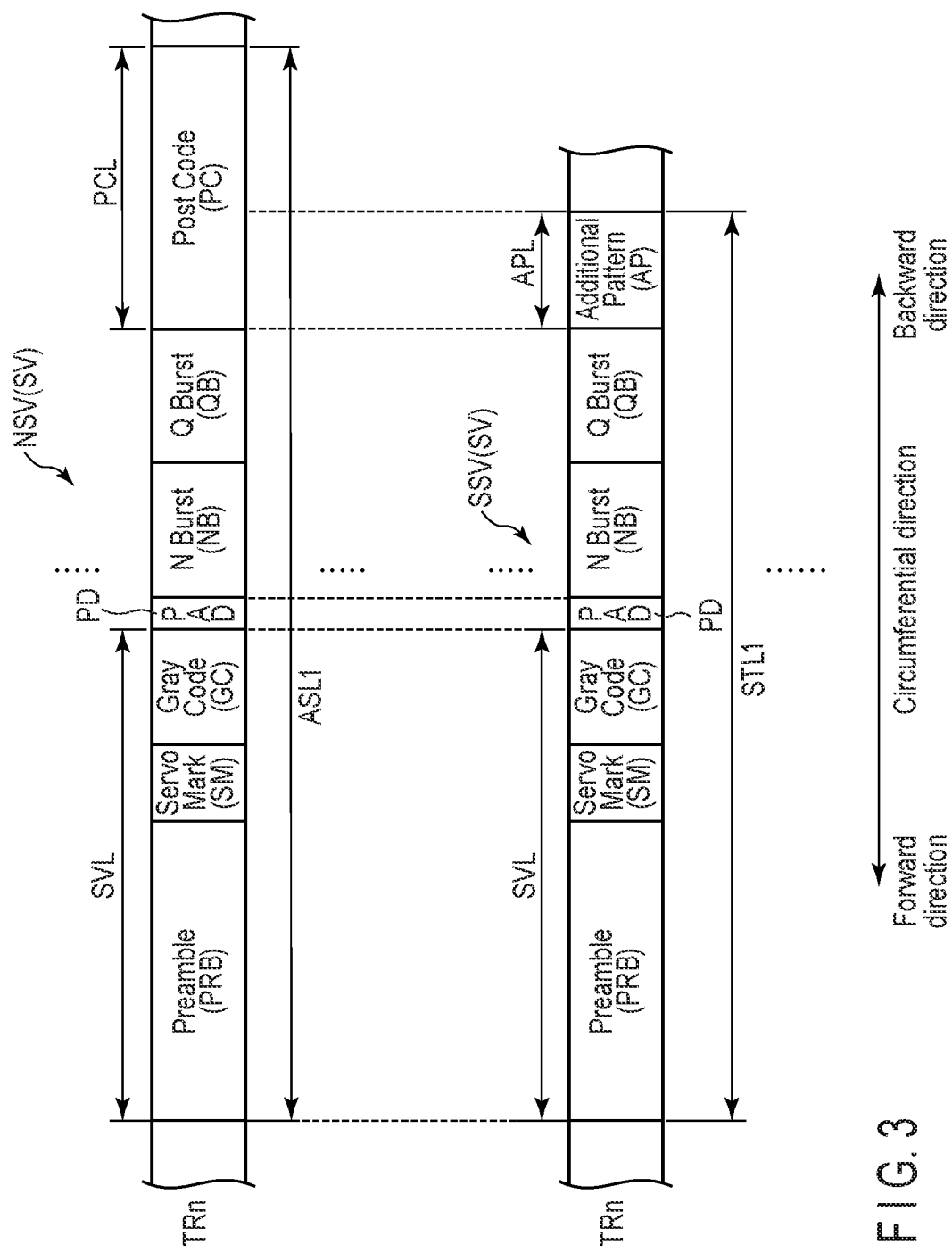
FIG. 3 is a schematic diagram illustrating an example of configurations of normal servo data and short serve data according to the first embodiment.

FIG. 3 is a schematic diagram illustrating an example of the configuration of the normal servo data NSV and the short servo data SSV according to the present embodiment. FIG. 3 illustrates particular normal servo data KSV and particular short servo data SSV written to a particular track TRn. In the particular track TRn, data is written from the forward direction in the circumferential direction to the backward direction opposite to the forward direction. For example, the forward direction corresponds to a temporally or physically forward direction in the circumferential direction, and the backward direction corresponds to a temporally or physically backward direction in the circumferential direction. In the following, the front direction may be referred to as front, forward, head, or head direction, and the backward direction may be referred to as rear or backward. FIG. 3 illustrates a length ASL1 of the normal servo data NSV and a length STL1 of the short servo data SSV.

The normal, servo data NSV includes, for example, a preamble PBB, a servo mark SM, a gray code GC, a PAD PD, burst data, and a post code PC. It should be noted that the normal servo data NSV does not necessarily have to include the post code PC. The preamble PRB, the servo mark SM, the gray code GC, the PAD PD, the burst data, and the post code PC are continuously disposed in this order from the front direction to the backward direction in the circumferential direction. The preamble PRB includes preamble information for synchronization with a read signal of a servo pattern including the servo mark SM, the gray code GC, and the like. The servo mark SM includes servo mark information indicating the start of the servo pattern. The gray code GC includes an address (cylinder address) of a particular track and an address of a servo sector of the particular track. In the example illustrated in FIG. 3, a total length SVL of the preamble PRB, the servo mark SM, and the gray code GC is smaller than the normal servo data NSV. The burst data is data (relative position data) used to detect a positional deviation (position error) in the radial direction and/or the circumferential direction of the head 15 to the track center of a particular track, and includes a repetitive pattern of s particular cycle. In the following, the positional deviation (position error) of the head 15 in the radial direction to the track center of the particular track detected using the burst data may be referred to as a servo demodulation position, a servo off track position, or a demodulation position. The PAD includes PAD information of a synchronization signal such as a gap and a servo AGC. The burst data is written in a data pattern in which the phase of the burst data is inverted by 180° at one servo track cycle in the radial direction of the disk 10. In other words, the phase of the waveform of the burst, data calculated by demodulating the particular burst data by, for example, discrete Fourier transform (DFT) or the like is inverted by 180° to the phase of the adjacent burst data calculated by demodulating the particular burst data (in the following, referred to as adjacent burst data) adjacent in the radial direction of the burst data. The servo track (servo cylinder) corresponds to a track to be subjected to write processing or read processing by a command from the host 100 or the like. In the following, for convenience of description, "the phase of the waveform of the particular data calculated by demodulating the particular data by, for example, discrete Fourier transform or the like" is simply referred to as "the phase of the particular data". The burst data is used, for example, to obtain the radial and/or circumferential position (in the following, sometimes referred to as a head position) of the head 15 in the disk 10. The burst data includes, for example, N-burst (N-Burst) data NB and Q-burst (Q-Burst) data QB. The N-burst data NB and the Q-burst. data QB are written in a data pattern in which burst track center positions are shifted from each other by 0.5 servo track in the radial direction of the disk 10. In other words, the burst track center position of the N-burst data NB and the burst track center position of the Q-burst data QB are, for example, shifted from each other by 0.5 servo track in the radial direction. The post code PC includes data (in the following, referred to as RRO correction data) and the like for correcting an error caused by track distortion to a track center (target path) concentric with the disk 10 caused by blurring (repeated runout: RRO) in synchronization with the rotation of the disk 10 in the case in which servo data is written to the disk. In the following, for convenience of description, an error caused by track distortion to the track center caused by the RRO may be simply referred to as an RRO. The post code PC may also include a post code PC corresponding to the short servo data SSV. The frequency of the waveform of the particular post coco PC calculated by demodulating the particular post code PC by, for example, discrete Fourier transform is equivalent to the frequency of the waveform of the particular preamble PRB calculated by demodulating the particular preamble PRB by, for example, discrete Fourier transform. In the following, for convenience of description, "the frequency of the waveform of the particular data calculated by demodulating the particular data by discrete Fourier transform or the like" is simply referred to as "the frequency of the data". The phase of the post code PC irregularly changes in the circumferential direction. The length PCL of the post code PC is, for example, several tens of dibits. The length PCL of the post code PC is shorter than the length ASL1 of the normal servo data NSV. Here, one dibit is, for example, the reciprocal of the frequency of the preamble (servo preamble) PRB. In other words, one dibit corresponds to a period of a waveform of a particular preamble PRB calculated by demodulating the preamble PRB by, for example, discrete Fourier transform or the like. In the following, for convenience of description, "a cycle of a waveform of particular data calculated by demodulating the particular data by discrete Fourier transform or the like" is simply referred to as "a cycle of data". When the frequency of the preamble PRB is FP, one dibit is expressed by 1/FP. Furthermore, for example, 1 dibit=1e9/ServoFreq [ns].

The short serve SSV includes, for example, a preamble PRB, a servo mark SM, a gray code GC, a PAD PD, burst data (N-burst data NB and Q-burst data QB), and an additional pattern (Additional Pattern) AP. The preamble PRB, the servo mark SM, the gray code GC, the PAD PD, the burst data, and the additional pattern AP are continuously disposed in this order from the front direction to the backward direction in the circumferential direction. The length of the preamble PRB of the short servo SSV is, for example, equal to the length of the preamble PRB of the normal servo data NSV. It should be noted that the length of the preamble PRB of the short servo SSV may be different from the length of the preamble PRB of the normal servo data NSV. The length of the servo mark SM of the short servo SSV is, for example, equal to the length of the servo mark SM of the normal servo data NSV. It should be noted that the length of the servo mark SM of the short servo SSV may be different from the length of the servo mark SM of the normal servo data NSV. The length of the gray code GC of the short servo SSV is equal to the length of the gray code GC of the normal servo data NSV, for example. It should be noted that the length of the gray code GC of the short servo SSV may be different from the length of the gray code GC of the normal servo data NSV. The length of the PAD PD of the short serve SSV is, for example, equal to the length of the PAD PD of the normal servo data NSV. It should be noted that the length of the PAD PD of the short servo SSV may be different from the length of the PAD PD of the normal servo data NSV. The length of the burst data of the short servo SSV is, for example, equal to the length of the burst data of the normal servo data NSV. It should be noted that the length of the burst data of the short servo SSV may be different from the length of the burst data of the normal servo data NSV. The length of the tv-burst data NB of the short servo SSV is, for example, equal to the length of the N-burst data NB of the normal servo data NSV. It should be noted that the length of the N-burst of the short servo SSV may be different from the length of the N-burst of the normal servo data NSV. The length of the Q-burst data QB of the short servo SSV is, for example, equal to the length of the Q-burst data QB of the normal servo data NSV. It should be rioted that the length of the Q-burst data QB of the short servo SSV may be different from the length of the Q-burst data QB of the normal servo data NSV. The additional pattern AF is data different from the post code PC. The frequency of the additional pattern AP is different from the frequency FP of the preamble. In other words, the frequency of the additional pattern AP is different from the frequency of the pest code PC. For example, the frequency of the additional pattern AP is equivalent to the frequency of the burst data, for example, the frequency of the N-burst data NB and the frequency of the Q-burst data QB. For example, the frequency of the additional pattern AP is FP/2. The phase of the additional pattern AP periodically changes in the circumferential direction. The additional pattern AP is written in a data pattern in which phases are equal in 0.5 servo track periods or one servo track period in the radial direction of the disk 10. In other words, the phase of the particular additional pattern AP is equal to the phase of the additional pattern (in the following, referred to as an adjacent addition pattern) adjacent to the additional pattern AP in the radial direction. The length APL of the additional pattern AP is shorter than the length STL1 of the short servo data SSV. The length APL of the additional pattern AP is shorter than the length PCL of the post code PC. For example, when the frequency of the additional patterns is FAD, the length APL of the additional pattern is expressed by the following formula.

$$PCL > APL \geq (2/FP + 1/FAD) \quad (1)$$

Here, 2/FP is, for example, two dibits. In other words, the length APL of the additional pattern is equal to or longer than the sum of twice one period of the preamble and one period of the additional pattern. For example, the length APL of the additional pattern is four dibits or more and leas than the length PCL of the post code. The length APL of the additional pattern is less than the sum SVL of the lengths up to the preamble PRB, the servo mark SM, the gray code GC, and the PAD PD.

$$SVL \geq PCL > APL \geq (2/FP + 1/FAD) \quad (2)$$

Figure 4:
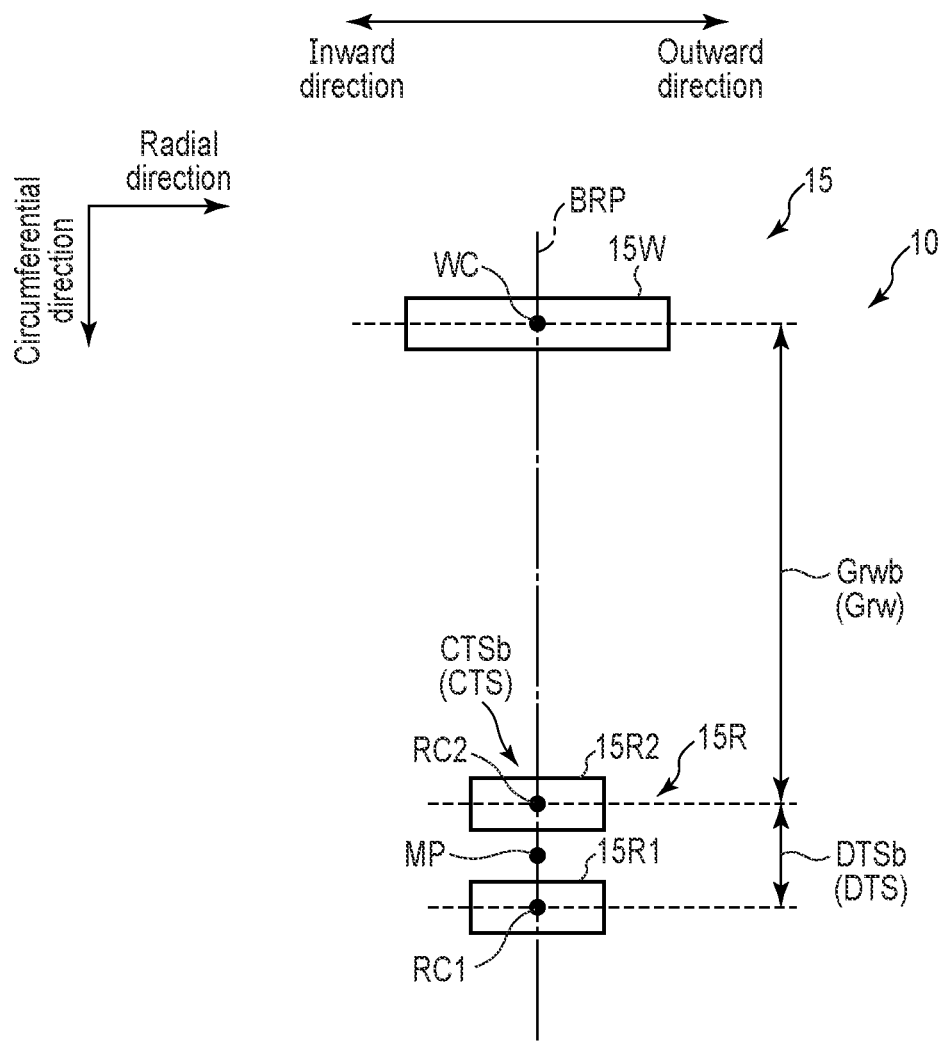
FIG. 4 is a schematic diagram illustrating an example of a geometric arrangement of a write head and two read heads in the case in which the read head is positioned at a reference position.

FIG. 4 is a schematic diagram illustrating an example of a geometric arrangement of the write head 15W and the two read heads 15R1 and 15R2 in the case in which the read head 15R1 is positioned at the reference position BRP. FIG. 4 illustrates a center part WC of the write head 15W, a center part RC1 of the read head 15R1, a center part RC2 of the read head 15R2, and an intermediate part MP located between the center part RC1 of the read head 15RI and the center part RC2 of the read head 15R2. In the following, the interval in the circumferential direction between the center part RC1 of the read head 15R1 and the center part RC2 of the read head 15R2 may be referred to as a down track separation (DTS). The interval in the radial direction between the center part RC1 of the read head 15R1 and the center part RC2 of the read head 15R2 may be referred to as a cross track separation (CTS). The interval between the read head 15R and the write head 15W, for example, the interval in the circumferential direction between the center part RC1 of the read head 15R1 and the center part WC of the write head 15W, the interval in the circumferential direction between the center part RC2 of the read head 15R2 and the center part WC of the write head 15W, and the interval in the circumferential direction between the intermediate part MP and the center port WC of the write head 15W may be referred to as a read/write gap. In the following, the interval in the circumferential direction between the center part RC2 of the read head 15R2 and the center part WC of the write head 15W will be described as a read/write gap Grw. Tor convenience of description, the "center part of the write head" and the "each portion of the write head" may be simply referred to as a "write head", and the "center part of the read head", the "intermediate part of two read heads among the plurality of read heads", and the "each portion of the read head" may be simply referred to as a "read head".

In the example illustrated in FIG. 4, in the case in which the read head 15R1 is disposed at the reference position BRP, the write head 15W, the read head 15R1, the read head 15R2, and the intermediate part MP are arranged along the circumferential direction. In the case in which the read head 15R1 is disposed at the reference position BRP, the read/write gap Grw is a distance Grwb. In the case in which the read head 15R1 is disposed at the reference position BRP, the down track separation DTS is a distance DTSb.

In the example illustrated in FIG. 4, in the case in which the read head 15R1 is disposed at the reference position BRP, the write head 15W, the read head 15R1, the read head 15R2, and the intermediate part MP are not displaced in the radial direction. In the case in which the read head 15R1 is disposed at the reference position BRP, the cross track separation CTS is a distance CTSb (=0). It should be noted that in the case in which the read head 15R1 is disposed at the reference position BRP, the write head 15W, the read head 15R1, the read head 15R2, and the intermediate part MP may be displaced in the radial direction.

Figure 5:
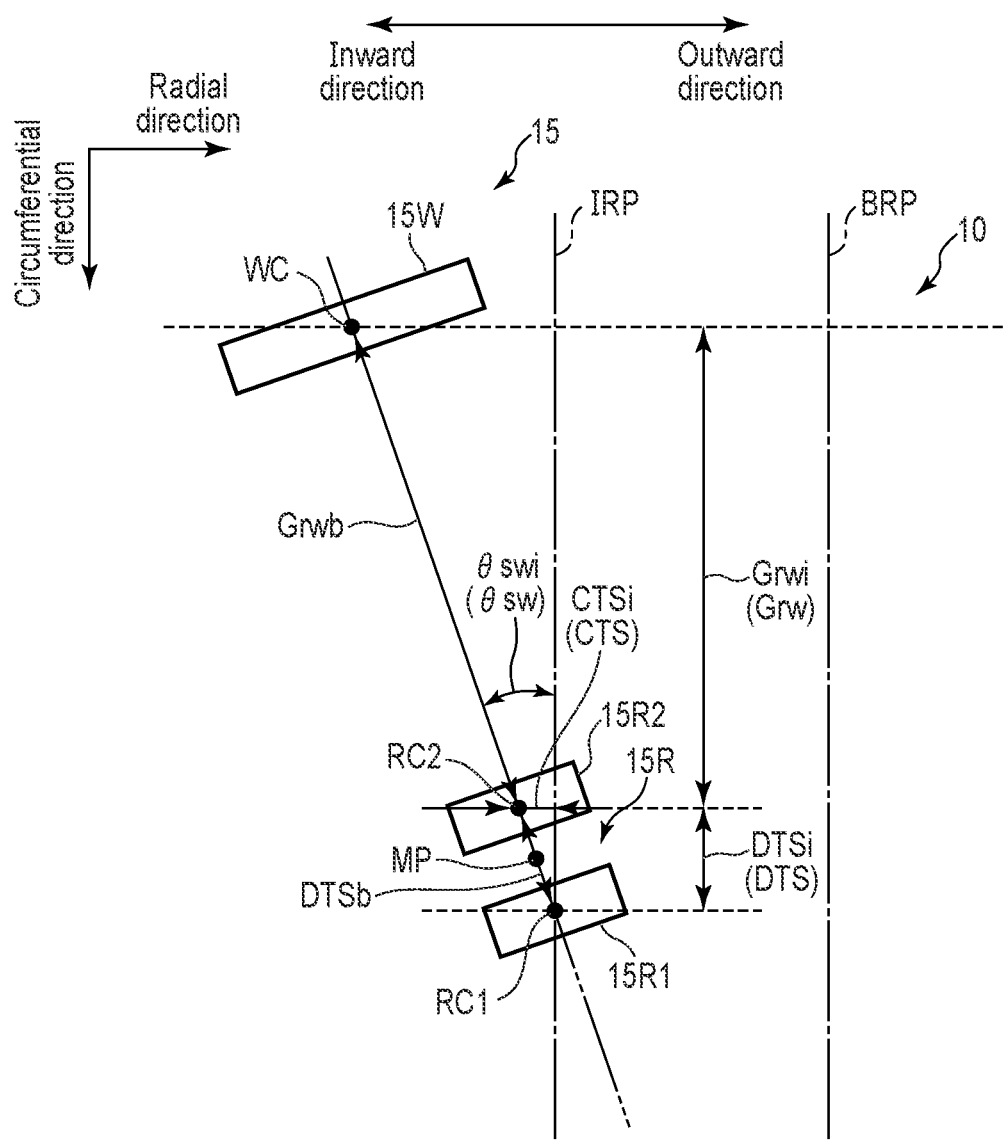
FIG. 5 is a diagram illustrating an example of a geometric arrangement of a write head and two read heads in the case in which the read head is positioned at a radial position.

FIG. 5 is a diagram illustrating an example of the geometric arrangement of the write head 15W and the two read heads 15R1 and 15R2 in the case in which the read head 15R1 is positioned at the radial position IRP.

In the example illustrated in FIG. 5, in the case in which the read head 15R1 is disposed at the radial position IRP, the write head 15W, the read head 15R1, the read head 15R2, and the intermediate part MP (head 15) are inclined inward at a skew angle θsw=θswi to an axis extending in the circumferential direction. In the case in which the read head 15R1 is disposed at the radial position IRP, the read/write gap Grw is a distance Grwi. In the case in which the read head 15R1 is disposed at the radial position IRP, the down track separation DTS is a distance DTSi.

In the example illustrated in FIG. 5, in the case in which the read head 15R1 is disposed at the radial position IRP, the write head 15W, the read head 15R1, the read head 15R2, and the intermediate part MP are displaced in the radial direction. In the case in which the read head 15R1 is disposed at the radial position IRP, the cross track separation CTS is a distance CTSi.

Figure 6:
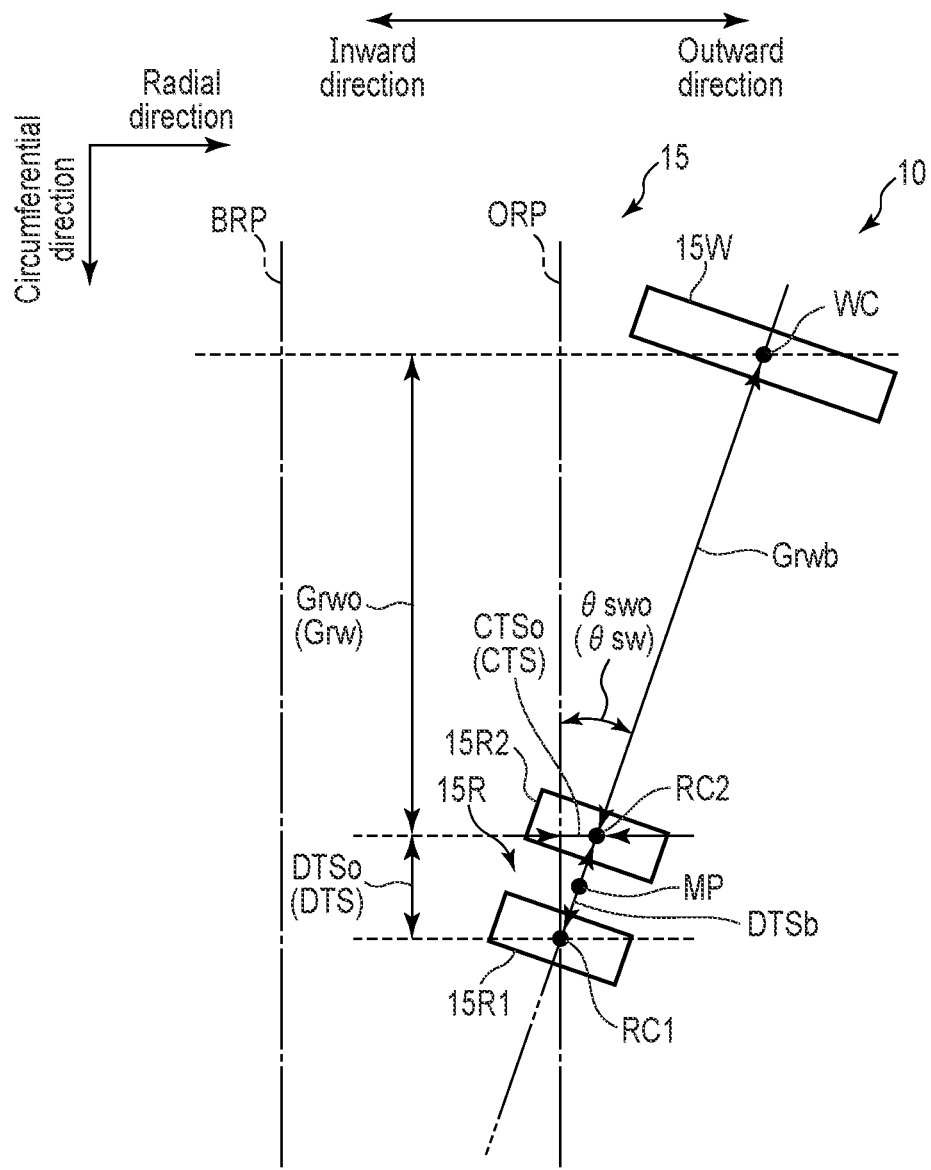
FIG. 6 is a diagram illustrating an example of a geometric arrangement of a write head and two read heads in the case in which the read head is positioned at a radial position.

FIG. 6 is a diagram illustrating an example of the geometric arrangement of the write head 15W and the two read heads 15R1 and 15R2 in the case in which the read head 15R1 is positioned at the radial position ORP.

In the example illustrated in FIG. 6, in the case in which the read head 15R1 is disposed at the radial position ORP, the write head 15W, the read head 15R1, the read head 15R2, and the intermediate part MP (head 15) are inclined outward at a skew angle θsw=θswo to an axis extending in the circumferential direction. In the case in which the read head 15R1 is disposed at the radial position ORP, the read/write gap Grw is a distance Grwo. In the case in which the read head 15R1 is disposed at the radial position ORP, the down track separation DTS is a distance DTSo.

In the example illustrated in FIG. 6, in the case in which the read head 15R1 is disposed at the radial position ORP, the write head 15W, the read head 15R1, the read head 15R2, and the intermediate part MP are displaced in the radial direction. In the case in which the read head 15R1 is disposed at the radial position ORP, the cross track separation CTS is a distance CTSo.

The driver IC 20 controls driving of the SPM 12 and the VCM 14 according to control of the system controller 130 (in detail, an MFU 40, described later).

The head amplifier IC (preamplifier) 30 includes a read amplifier and a write driver. The read amplifier amplifies the read signal read from the disk 10 and outputs the amplified read signal to the system controller 130 (in detail, a read/write (R/W) channel 60, described later). The write driver outputs a write current corresponding to the write data output from the R/W channel 60 to the head 15.

The volatile memory 70 is a semiconductor memory in which stored data is lost when power supply is cut off. The volatile memory 70 stores data and any other information necessary for processing in the units of the magnetic disk device 1. The volatile memory 70 is, for example, a dynamic random access memory (DRAM) or a synchronous dynamic random access memory (SDRAM).

The nonvolatile memory 80 is a semiconductor memory that, records stored data even when power supply is cut off. The nonvolatile memory 80 is, for example, a NOR type or NAND type flash read only memory (FROM).

The buffer memory 90 is a semiconductor memory that temporarily records data and the like transmitted and received between the magnetic disk device 1 and the host 100. It should be noted that the buffer memory 90 may be formed integrally with the volatile memory 70. The buffer memory 90 is, for example, a DRAM, a static random access memory (SRAM), an SDRAM, a ferroelectric random access memory (FeRAM), a magnetoresistive random access memory (MRAM), or the like.

The system controller (controller) 130 is embodied by using, for example, a large-scale integrated circuit (LSI) referred to as a system-on-a-chip (SoC) in which a plurality of elements is integrated on a single chip. The system controller 130 includes a microprocessor (MPU) 40, a hard disk controller (HDC) 50, and a read/write (R/W) channel 60. The system controller 130 is electrically connected to, for example, the driver IC 20, the head amplifier IC 30, the volatile memory 70, the nonvolatile memory 80, the buffer memory 90, and the host 100.

The MPU 40 is a main controller that controls the units of the magnetic disk device 1. The MPU 40 controls the VCM 14 through the driver IC 20 to execute servo control for positioning the head 15. The MPU 40 controls the SPM 12 through the driver IC 20 to rotate the disk 10. The MPU 40 controls a write operation of data to the disk 10, and selects a storage destination of the write data. The MPU 40 controls a read operation of data from the disk 10, and controls processing of the read data. The MPU 40 is connected to the units of the magnetic disk device 1. The MPU 40 is electrically connected to, for example, the driver IC 20, the HDC 50, the R/W channel 60, and any other component.

The HDC 50 controls data transfer between the host 100 and the R/W channel 60 according to an Instruction from the MPU 40. In accordance with an Instruction from the MPU 40, the HDC 50 generates various gates, for example, a write gate, a read gate, a servo gate (a normal servo gate and a short servo gate), and any other gate, and outputs the gates to the R/W channel 60. In the following, "servo-reading (reading) burst data in servo data according to a short servo gate, i.e., servo read processing of reading durst data and not reading at least the preamble PRB, the servo mark SM, and the gray code GC", may be referred to as "short servo mode". The "servo read processing of serve-reading (reading) at least the preamble PRB, the servo mark SM, the gray code GC, and the burst data in the servo data according to the normal servo gate" may be referred to as "normal servo mode". The "servo read processing of servo-reading (reading) all the servo data according to the normal servo gate" may be referred to as a "normal servo mode". For example, the short servo data SSV is servo-read in the short servo mode. It should be noted that the short servo data SSV may be servo-read in the normal servo mode. For example, the normal servo data NSV is servo-read in the normal servo mode. It should be noted that the normal servo data NSV may be servo-read in the short servo mode. In the following, "reading the short servo data SSV" may be used in the same meaning as "reading in the short servo mode", or "reading the normal servo data NSV" may be used in the same meaning as "reading in the normal servo mode". The "servo read" may be simply referred to as "read". The HDC 60 is electrically connected to, for example, the MPU 40, the R/W channel 60, the volatile memory 70, the nonvolatile memory 80, the buffer memory 90, and any other component.

In response to an instruction from the MPU 40, the R/W channel 60 executes signal processing of read data transferred from the disk 10 to the host 100 and write data transferred from the host 100, for example, modulation processing, demodulation processing, encoding processing, decoding processing, and any other processing. The R/W channel 60 has a circuit or a function of measuring signal quality of read data. The R/W channel 60 detects various gates, for example, a write gate WG corresponding to a signal for writing data, a read gate RG corresponding to a signal for reading data, a servo gate SG corresponding to a signal for reading servo, and any other component. For example, the R/W channel 60 executes signal processing of write data according to the write gate, executes signal processing of read data according to the read gate, and executes signal processing (in the following, sometimes referred to as servo read processing) of servo data according to the servo gate. The R/W channel 60 is electrically connected to, for example, the head amplifier IC 30, the MPU 40, the HDC 50, and any other component.

FIG. 7 is a block diagram illustrating an example configuration of the R/W channel 60 according to the present embodiment.

In the example illustrated in FIG. 7, the R/W channel 60 includes a selection unit 610, a calculation unit 620, and a position demodulation unit 630. The R/W channel 60 executes processing of these units, for example, the selection unit 610, the calculation unit 620, the position demodulation unit 630, and any other component on firmware. It should be noted that the R/W channel 60 may include these units, for example, the selection unit 610, the calculation unit 620, the position demodulation unit 630, and any other component as circuits. The selection unit 610, the calculation unit 620, and the position demodulation unit 630 may be included in the MPU 40 or the HDC 50.

The selection unit 610 selects burst data to be read from the burst data of the servo data SV. The selection unit 610 selects at least one piece of burst data to be read from the burst, data of the servo data SV. For example, the selection unit 610 selects whether, to read the N-burst data NB and the Q-burst data QB, read the N-burst data NB, or read the Q-burst data QB.

The selection unit 610 selects burst data to be read from the burst data of the servo data SV based on the read/write gap Grw, the cross track separation (CTS), and the servo data SV. The selection unit 610 selects whether to read all burst data of the servo data SV, read burst data disposed in the forward direction in the burst data of the servo data SV, or read burst, data disposed in the backward direction in the burst data of the servo data SV based on the read/write gap Grw, the cross track separation CTS, and the servo data SV. For example, the selection unit 610 selects whether to read the N-burst data NB and the Q-burst data QB, read the N-burst data NB, or read the Q-burst data QB based on the read/write gap Grw, the cross track separation CTS, and the servo data SV.

In the case in which the normal servo data NSV is read in the normal servo mode, the selection unit 610 selects whether to read all the burst data of the normal servo data NSV, read the burst data disposed in the forward direction m the burst data of the normal servo data NSV, or read the burst data disposed in the backward direction in the burst data of the normal servo date NSV. For example. In the case in which the normal servo data NSV is read in the normal serve mode, the selection unit 610 selects whether to read the N-burst data N3 and the Q-burst data QB, read the N-burst data NB, or read the Q-burst data QB.

In the case in which the short servo data SSV is read in the short servo node, the selection unit 610 selects whether to read all burst data of the short servo data SSV, read burst data disposed in the forward direction in the burst data of the short servo data SSV, or read burst data disposed in the backward direction in the burst data of the short servo data SSV based on the read/write gap Grw and the cross track separation CTS. For example, in the case in which the short servo data SSV is read in the short servo mode, the selection unit 610 selects whether to read the N-burst data NB and the Q-burst data QB, read the N-burst data NB, or read the Q-burst data QB based on the read/write gap Grw and the cross track separation CTS. For example, in reading the short servo data SSV in the short servo mode, in the case in which the read/write gap Grw is equal to or larger than a particular threshold (in the following, sometimes referred to as a read/write gap threshold) and the cross track separation (CTS) is equal to or larger than a particular threshold (in the following, sometimes referred to as a cross track threshold), the selection unit 610 selects whether to read burst data disposed in the backward direction among the burst data of the short servo data SSV, for example, the Q-burst data QB. The read/write gap threshold corresponds to the read/write gap Grw that the write head 15W does not reach a region in which the write head 15W can write the user data located immediately before the short servo data SSV when the burst gate that servo-reads the burst data in the forward direction in the servo read processing of the short servo data using the particular read head 15R, for example, the N-burst data BB, is asserted. The read/write gap threshold value corresponds to the read/write gap Grw in which the write head 15W does not reach a degaussing region DGP91 when the read head 15R, for example, the read head 15R2 reaches burst data located in the forward direction in the burst data, for example, the N-burst data NB. In other words, the read/write gap threshold value corresponds to the read/write gap Grw in which the write head 15W is located closer to the user data UD from the boundary between the short servo data SSV and the user data UD when the read head 15R, for example, the read head 15R2 reaches the burst data located in the forward direction in the burst data, for example, the N-burst data NB. The cross track threshold value corresponds to a cross track separation at which one burst data in the burst data can be read using a plurality of read heads 15R, for example, the read head 15R1 and the read head 15R2. For example, in the case in which the read/write gap Grw is smaller than the read/write gap threshold when the short servo data SSV is read in the short servo mode, the selection unit 610 selects whether to read the N-burst data NB and the Q-burst data QB or to read the N-burst data NB. For example, in reading the short servo data SSV in the short serve mode, in the case in which the read/write gap Grw is equal to or larger than the read/write gap threshold and the cross track separation (CTS) is smaller than the cross track threshold the selection unit 610 selects whether to read the N-burst data NB and the Q-burst data QB or to read the N-burst data NB.

In the case in which the short servo data SSV is read in the normal servo mode in Seek, the selection unit 610 selects whether to read all the burst data of the short serve data SSV, read the burst data disposed in the forward direction in the burst data of the short serve data SSV, or read the burst data disposed in the backward direction in the burst data of the short servo data SSV. For example, in the case in which the short servo data SSV is road in the normal servo mode, the selection unit 610 selects whether to read the N-burst data NB and the Q-burst data QB, read the N-burst data NB, or read the Q-burst data QB.

The calculation unit 620 calculates a demodulated signal component (in the following, sometimes referred to as a burst demodulation signal component) of the read burst data. The calculation unit 620 calculates demodulated signal components (in the following, sometimes referred to as an N-burst demodulation signal component and a Q-burst demodulation signal component) of the N-burst data NB and the Q-burst data QB.

For example, in the case in which the Q-burst data QB3 of the short servo data SSV is read, the calculation unit 620 calculates an N-burst demodulation signal component and a Q-burst demodulation signal component based on a sin component (in the following, sometimes referred to as a Q1sin component) of the Q-burst data QB read using the read head 15R1, a cos component (in the following, sometimes referred to as a Q1cos component) of the Q-burst data QB read using the read head 15R1, a sin component (in the following, sometimes referred to as a Q2sin component) of the Q-burst data Q3 read using the read head 15R2, a cos component (in the following, sometimes referred to as a Q2cos component) of the Q-burst data QB read using the read head 15R2, and a cross track separation (CTS). For example, in the case in which the N-burst data NB are the Q-burst data QB of the short servo data SSV are read, the calculation unit 620 calculates an N-burst demodulation signal component and a Q-burst demodulation signal component based on the sin component (in the following, sometimes referred to as an N2sin component) of the N-burst data NB read using the read head (in the following, the reference read head may be referred to as a reference read head) serving as a reference, for example, the read head 15R2, the cos component (in the following, sometimes referred to as an K2cos component) of the N-burst data NB read using the read head 15R2, the Q2sin component, and the Q2cos component. For example, in the case in which the N-burst data NB of the short servo data SSV is read, the calculation unit 620 calculates the N-burst demodulation signal component and the Q-burst demodulation signal component based on the sin component (in the following, sometimes referred to as an N1sin component) of the N-burst data NB read using the read head 15R1, the cos component (in the following, sometimes referred to as an N1cos component) of the N-burst data NB read using the read head 15R1, the N2sin component, the N2cos component, and the cross track separation (CTS).

For example, in the case in which the N-burst data NB of the normal servo date NSV is read, the calculation unit 620 calculates the N-burst demodulation signal component and the Q-burst demodulation signal component based on the N1sin component, the N1cos component, the N2sin component, the N2cos component, and the cross track separation CTS. For example, in the case in which the N-burst data NB and the Q-burst data QB of the normal servo data NSV are read, the calculation unit 620 calculates the N-burst demodulation signal component and the Q-burst demodulation signal component based on the Q2sin component, the Q2cos component, the N2sin component, and the N2cos component read by the reference head 15, for example, the read head 15R2.

The position demodulation unit 630 calculates a servo demodulation position. For example, the position demodulation unit 630 calculates the servo demodulation position based on the N-burst demodulation signal component and the Q-burst demodulation signal component.

Figure 8:
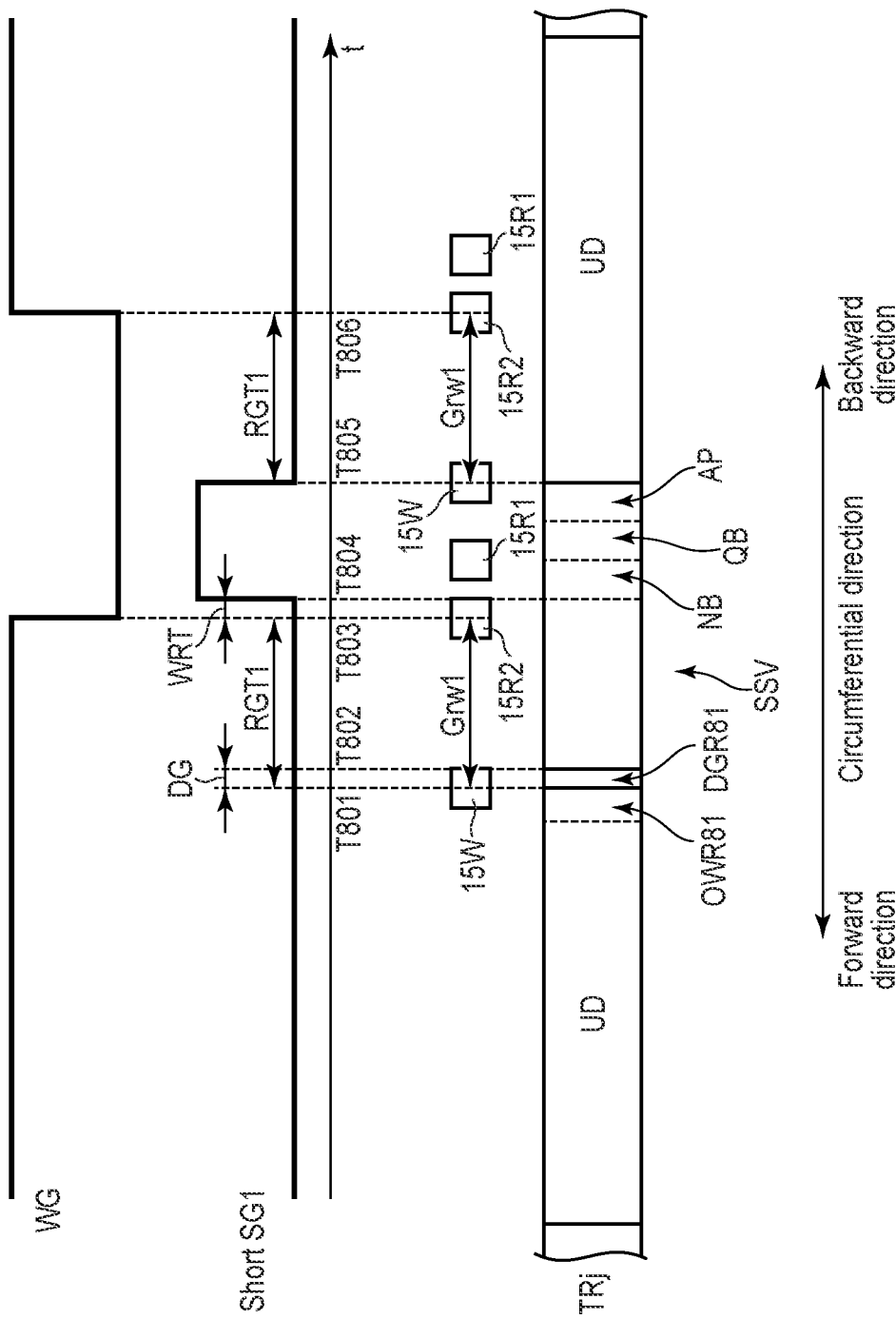
FIG. 8 is a schematic diagram illustrating an example of arrangement of various gates and heads.

FIG. 8 is a schematic diagram illustrating an example ol: arrangement or various gates and the head 15. FIG. 8 illustrates a write gate WG and a servo gate (short servo gate SG1) that servo-reads the short servo data SSV. These gates are asserted when rising and negated when falling. In FIG. 8, the horizontal axis of these gates expresses time t. The horizontal axis of FIG. 8 indicates timings T801, T802, T803, T804, T805, and T806. The timing T802 corresponds to the time after the timing T801, the timing T803 corresponds to the time after the timing T802, the timing T804 corresponds to the time after the timing T803, the timing T805 corresponds to the time after the timing T804, and the timing T806 corresponds to the time after the timing T805. The timing T803 corresponds to a timing at which the write gate is negated, the timing T801 corresponds to a timing at which degauss starts in the case in which the write gate is negated at the timing T803, and the timing T802 corresponds to a timing at which degauss ends when the write gate is negated at the timing T803. Here, degaussing means that a recording current to be attenuated from the head amplifier IC 30 when the write processing is stopped is supplied to the write head 15W for a short time. The timing T804 corresponds to a timing at which the short SG1 is asserted, and the timing T805 corresponds to a timing at which the short SG1 is negated. The timing T806 corresponds to a timing at which the write gate is asserted.

The difference value between the timings T801 and T802 corresponds to degaussing time (in the following, sometimes referred to as degaussing time) DG, the difference value between the timings T803 and T804 corresponds to a difference time WRT between the negation time of the write gate and the assertion time of the short SG1, and the difference value between the timings T801 and T803 and the difference value between the timings T805 and T806 corresponds to time (in the following, sometimes referred to as a read/write gap time) RGT1 corresponding to the read/write gap Grw1. The difference time WRT corresponds to time for transition from the write processing to the serve read processing, in the following, the difference time WRT may be referred to as a transition time WRT.

FIG. 8 illustrates a track TRj. In the crack TRj, the user data UD and the short servo data SSV are alternately disposed. In the example illustrated in FIG. 8, the user data UD and the short servo data SSV are adjacent to each other in the circumferential direction, and do not include a gap or the like between these pieces of data. The term "adjacent" includes not only data, an object, a region, a space, and the like arranged in contact with each other, but also includes these are arranged at particular intervals. The user data UD includes an overwrite region OWR81. The overwrite region OWR81 is a region in which the servo region that is not subjected to servo-reading is overwritten with the user data in the servo region written at the tame of servo writing. For example, the overwrite region OWR81 is adjacent to the short servo data SSV in the backward direction of the user data UD in the circumferential direction. The short servo data SSV includes a degaussing region DGR81, N-burst data NB, Q-burst data QB, and an additional pattern AP. The degaussing region DGP81 is a region in which particular data is overwritten by degaussing. For example, the degaussing region DGP81 is adjacent to (the overwrite region OWR81 of) the user data UD in the forward direction of the short servo data SSV in the circumferential direction. For example, the overwrite region OWR81 and the degaussing region DGR81 correspond to a particular region or the short servo data SSV in which the preamble is written before the particular data is overwritten.

FIG. 8 illustrates the write head 15W, the read head 15R1, and the read head 15R2. In the example illustrated in FIG. 8, although the write head 15W, the read head 15R1, and the read head 15R2 are described such that the cross track separation (CTS) is zero for convenience of description, the cross track separation (CTS) may be zero, or the cross track separation (CTS) does not necessarily have to be zero. In FIG. 8, the read/write gap Grw1 corresponds to a circumferential interval between the write head 15W and the read head 15R2. In FIG. 8, the read head 15S2 will be described as a reference read head. In the example illustrated in FIG. 8, the read head 15R2 is located in the degaussing region DGRP81 at the timing T801, located in the degaussing region DGR81 at the timing T802, located before the N-burst data NB of the short servo data SSV at the timing T803, located in the N-burst data NB at the timing T804, located in the additional pattern AP of the short servo data SSV at the timing T805, and located in the user data UD at the timing T806.

In the case in which the servo read processing is executed in response to the short SG1, the system controller 130 negates the write gate at the timing T803 so as not to overwrite the short servo data SSV with particular data. For example, the system controller 130 may calculate the time during which the servo mark SM is read using the read head 15R (for example, the read heads 15R1 and 15R2) by a test, for example, the read/write gap time RGT1, and the like for each head and each zone of the disk 10, and record these pieces of data in a particular recording region, for example, the system area 10b of the disk 10 or the nonvolatile memory 80.

In the case in which the servo read processing is executed according to the short SG1, the system controller 130 asserts the short SG1 at the timing T804 after the transition time WRT from the timing T803 at which the write gate is negated, and starts the servo read processing. The servo read processing is performed on, for example, the servo waveform read using the read head 15R2. It should be noted that the servo read processing may be performed using the read head 15R1 or may be performed using the read head 15R1 and the read head 15R2. After asserting the short SG1 at the timing T804, the system controller 130 reads the N-burst data NB, the Q-burst data Q3, and the additional pattern AP, and ends the servo read process at the timing T805. After ending the servo read processing at the timing T805, the system controller 130 asserts the write gate at the timing T806 after the read/write gap time RGT1 from the timing T805, and starts the write processing of the user data UD so as not to overwrite the short servo data SSV with the particular data.

Figure 9:
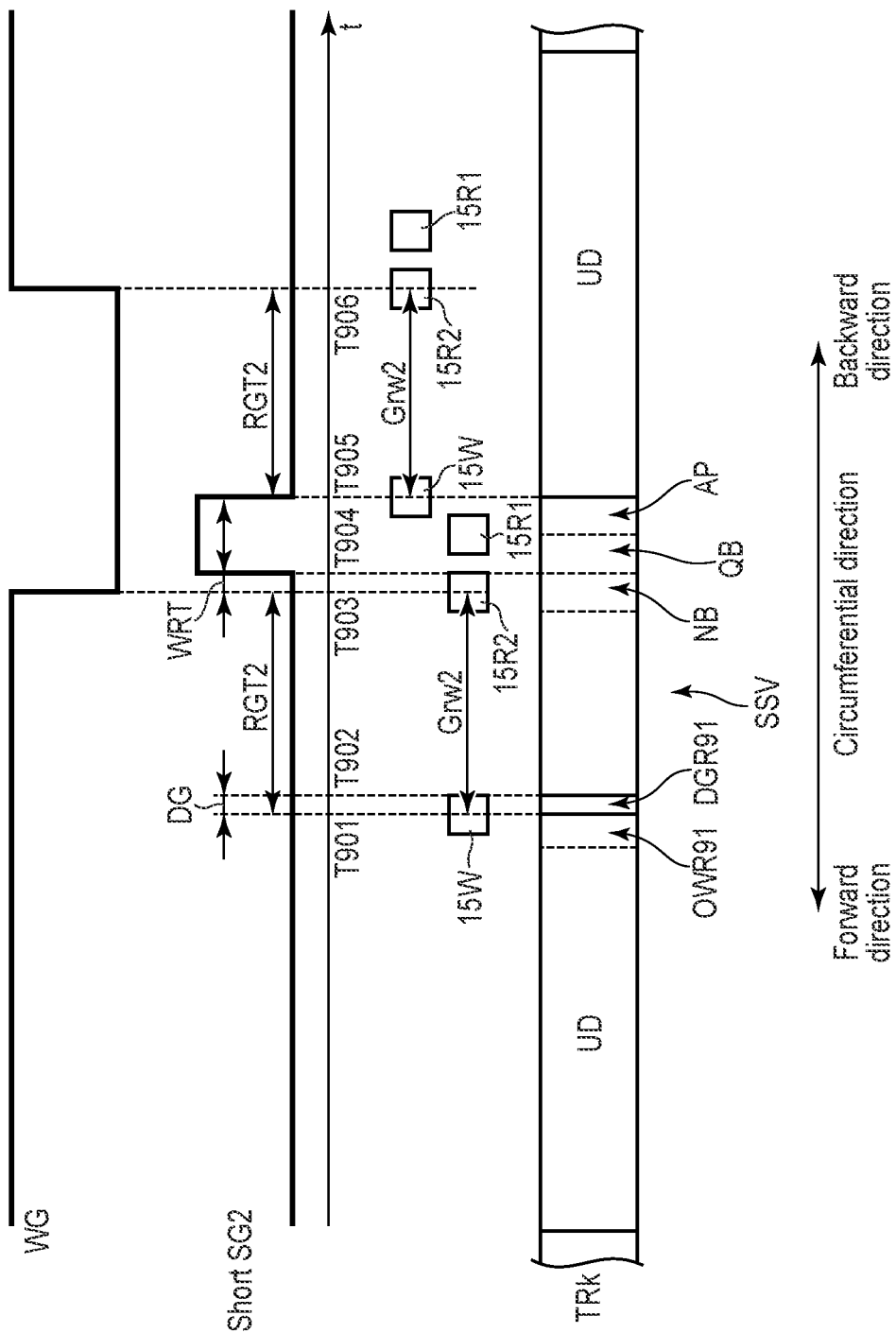
FIG. 9 is a schematic diagram illustrating an example of arrangement of various gates and heads.

FIG. 9 is a schematic diagram illustrating an example of arrangement of various gates and the head 15. FIG. 9 illustrates a write gate WG and a short servo gate SG2. These gates are asserted when rising and negated when falling. In FIG. 9, the horizontal axis of these gates expresses time t. The horizontal axis of FIG. 9 indicates timings T901, T902, T903, T904, T905, and T906. The timing T902 corresponds to the time after the timing T901, the timing T903 corresponds to the time after the timing T902, the timing T904 corresponds to the time after the timing T903, the Liming T905 corresponds to the time after the timing T904, and the timing T906 corresponds to the time after the timing T905. The timing T903 corresponds to a timing at which the write gate is negated, the timing T901 corresponds to a start timing of degaussing in the case in which the write gate is negated at the timing T903, and the timing T902 corresponds to an end timing of degaussing in the case in which the write gate is negated at the timing T903. Here, degaussing means that a recording current to be attenuated from the head amplifier IC 30 when the write processing is stopped is supplied to the write head 15W for a short time. The timing T904 corresponds to a timing at which the short SG2 is asserted, and the timing T905 corresponds to a timing at which the short SG2 is negated. The timing T906 corresponds to a timing at which the write gate is asserted.

The difference value between the timings T901 and T902 corresponds to the degaussing time DG, the difference value between the timings T903 and T904 corresponds to the transition time WRT, and the difference value between the timings T901 and T903 and the difference value between the timings T905 and T906 correspond to the read/write gap time RGT2 corresponding to the read/write gap Grw2.

FIG. 9 illustrates a track TRk. In the track TRk, the user data UD and the short servo data SSV are alternately disposed. In the example illustrated in FIG. 9, the user data UD and the short servo data SSV are adjacent to each other in the circumferential direction, and do not include a gap or the like between these pieces of data. The user data UD includes an overwrite region OWR91. For example, the overwrite region OWR91 is adjacent to the short servo data SSV in the backward direction of the user data UD in the circumferential direction. The short, servo data SSV includes a degaussing region DGR91, N-burst data NB, Q-burst data QB, and an additional pattern AP. For example, the degaussing region DGR91 is adjacent to (the overwrite region OWR91 of) the user data UD in the forward direction of the short, servo data SSV in the circumferential direction.

FIG. 9 illustrates the write head 15W, the read head 15R1, and the read head 15R2. In the example illustrated in FIG. 9, although the write head 15W, the read head 15R1, and the read head 15R2 are described such that the cross track separation (CTS) is zero for convenience of description, the cross track separation (CTS) may be zero or the cross track separation (CTS) does not necessarily have to be zero. In FIG. 9, the read/write gap Grw2 corresponds to a circumferential interval between the write head 15W and the read head 15R2. The read/write cap Grw2 is larger than the read/write gap Grw1 illustrated in FIG. 8. The read/write gap Grw2 is, for example, larger than the read/write gap threshold. In FIG. 9, the read head 15R2 will be described as a reference read head. In the example illustrated in FIG. 9, the read head 15R2 is located in the degaussing region DGR91 at the timing T901, located in the degaussing region DGR91 at the timing T902, located in the N-burst data NB of the short serve data SSV at the timing T903, located in the Q-burst data QB of the short servo data SSV at the timing T904, located in the additional pattern AF of the short serve data SSV at the timing T905, and located in the user data UD at the timing T906.

In the case in which the servo read processing is executed in response to the short SG2, the system controller 130 negates the write gate at the timing T903 so as not to overwrite the short servo data SSV with particular data. For example, the system controller 130 may calculate the time during which the servo mark SM is read using the read head 15R (for example, the read heads 15R1 and 15R2) by a test, for example, the read/write gap time RGT2, and the like for each head and each zone of the disk 10, and record these pieces of data in a particular recording region, for example, the system area 10b of the disk 10 or the nonvolatile memory 80.

In the case in which the servo read processing is executed according to the short SG2, the system controller 130 asserts the short SG2 at the timing T904 after the transition time WRT from the timing T903 at which the write gate is negated, and starts the servo read processing. The servo read processing is performed on the servo waveforms read using the read head 15R1 and the read head 15R2. After asserting the short SG2 at the timing T904, the system controller 130 reads the Q-burst data QB and the additional pattern AP, and ends the servo read process at the timing T905. After ending the servo read processing at the timing T905, the system controller 130 asserts the write gate al the timing T906 after the read/write gap time RGT2 from the timing T905, and starts the write processing of the user data UD 30 as not to overwrite the short servo data SSV with the particular data.

Figure 10:
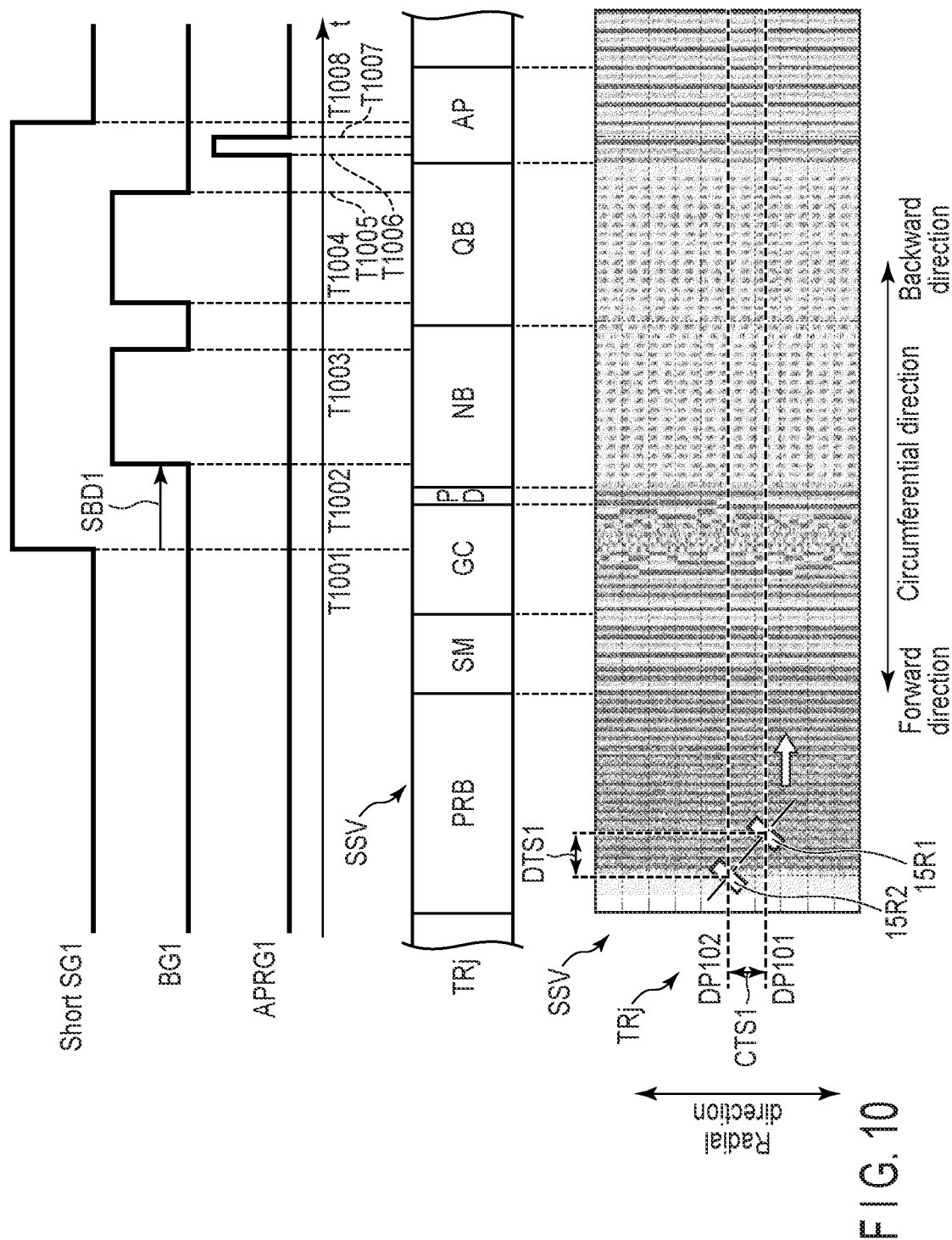
FIG. 10 is a schematic diagram illustrating an example of arrangement of various gates and heads for reading N-burst data and Q-burst data.

FIG. 10 is a schematic diagram illustrating an example of the arrangement of various gates and the head 15 for reading the N-burst data NB and the Q-burst data QB. FIG. 10 illustrates the short SG1, a servo gate (burst gate BG1) that performs servo read of burst data, and a servo gate (additional pattern read gate APRG1) that performs servo read of an additional pattern. Those gates are asserted when rising and negated when falling. In FIG. 10, the horizontal axis of these gates expresses time t. The horizontal axis of FIG. 10 indicates timings T1001, T1002, T1003, T1004, T1005, T1006, T1007, and T1008. The timing T1002 corresponds to the time after the timing T1001, the timing T1003 corresponds to the time after the timing T1002, the timing T1004 corresponds to the time after the timing T1003, the timing T1005 corresponds to the time after the timing T1004, the timing T1006 corresponds to the time after the timing T1005, the timing T1007 corresponds to the time after the timing T1006, and the timing T1008 corresponds to the time after the timing T1007. The timing T1001 corresponds to a timing at which the short SG1 is asserted, the timing T1002 corresponds to a timing at which BG1 is asserted, the timing T1003 corresponds to a timing at which BG1 is negated, the timing T1004 corresponds to a timing at which BG1 is asserted, the timing T1005 corresponds to a timing at which BG1 is negated, the timing T1006 corresponds to a timing at which APRG1 is asserted, the timing T1007 corresponds to a timing at which APRG1 is negated, and the timing T1008 corresponds to a timing at which the short SG1 is negated. The timing T1001 may correspond to the timing T804 illustrated in FIG. 8, for example. The timing T1008 may correspond to the timing T805 illustrated in FIG. 8, for example.

The difference value between the timing T1001 and the timing T1002 corresponds to time (in the following, sometimes referred to as a short assertion time) SBD1 from the assertion of the short SG1 to the assertion of BG1.

FIG. 10 illustrates the track TRj. The track TRj has the short, servo data SSV. The short servo data SSV includes a preamble PRB, a servo mark SM, a gray code GC, a PAD PD, N-burst data NB, Q-burst data QB, and an additional pattern AP. FIG. 10 illustrates servo patterns corresponding to the preamble PRB, the servo mark SM, the gray code GC, the PAD PD, the N-burst data NB, and the Q-burst data QB.

FIG. 10 illustrates the read head 15R1 and the read head 15R2. In FIG. 10, the read head 15R1 is disposed at a radial position DP101, and the read head 15R2 is disposed at a radial position DP102. In the example illustrated in FIG. 10, a cross track separation CTS1 between the read head 15R1 and the read head 15R2 and a down track separation DTS1 between the read head 15R1 and the read head 15R2 are illustrated. In FIG. 10, the read head 15R2 will be described as a reference read head. In the example illustrated in FIG. 10, the read head 15R2 is positioned in the gray code GC at the timing T1001, positioned in the N-burst data NB at the timing T1002, positioned in the N-burst data NB at the timing T1003, positioned in the Q-burst data QB at the timing T1004, positioned in the Q-burst data QB at the timing T1005, positioned in the additional pattern AP at the timing T1006, positioned in the additional pattern AP at the timing T1007, and positioned in the additional pattern AP at the timing T1008.

In the case in which the servo read processing is executed in response to the short SG1, the system controller 130 asserts the short SG1 at the timing T1001, and starts the servo read processing. The system controller 130 asserts BG1 for reading the N-burst data NB at the timing T1002 after the short assertion time SBD1 from the timing T1001 at which the short SG1 is asserted, completes the read processing of the N-burst data NB at the timing T1003, and negates the BG1. The system controller 130 asserts BG1 for reading the Q-burst data QB at the timing T1004, completes the read processing of the Q-burst data QB at the timing T1005, and negates BG1. The system controller 130 asserts the APRG1 for reading the additional pattern AP at the timing T1006, completes the read processing of the additional pattern AP at the timing T1007, and negates the APRG1. The system controller 130 negates the short SG1 at the timing T1008, and ends the servo read process.

Figure 11:
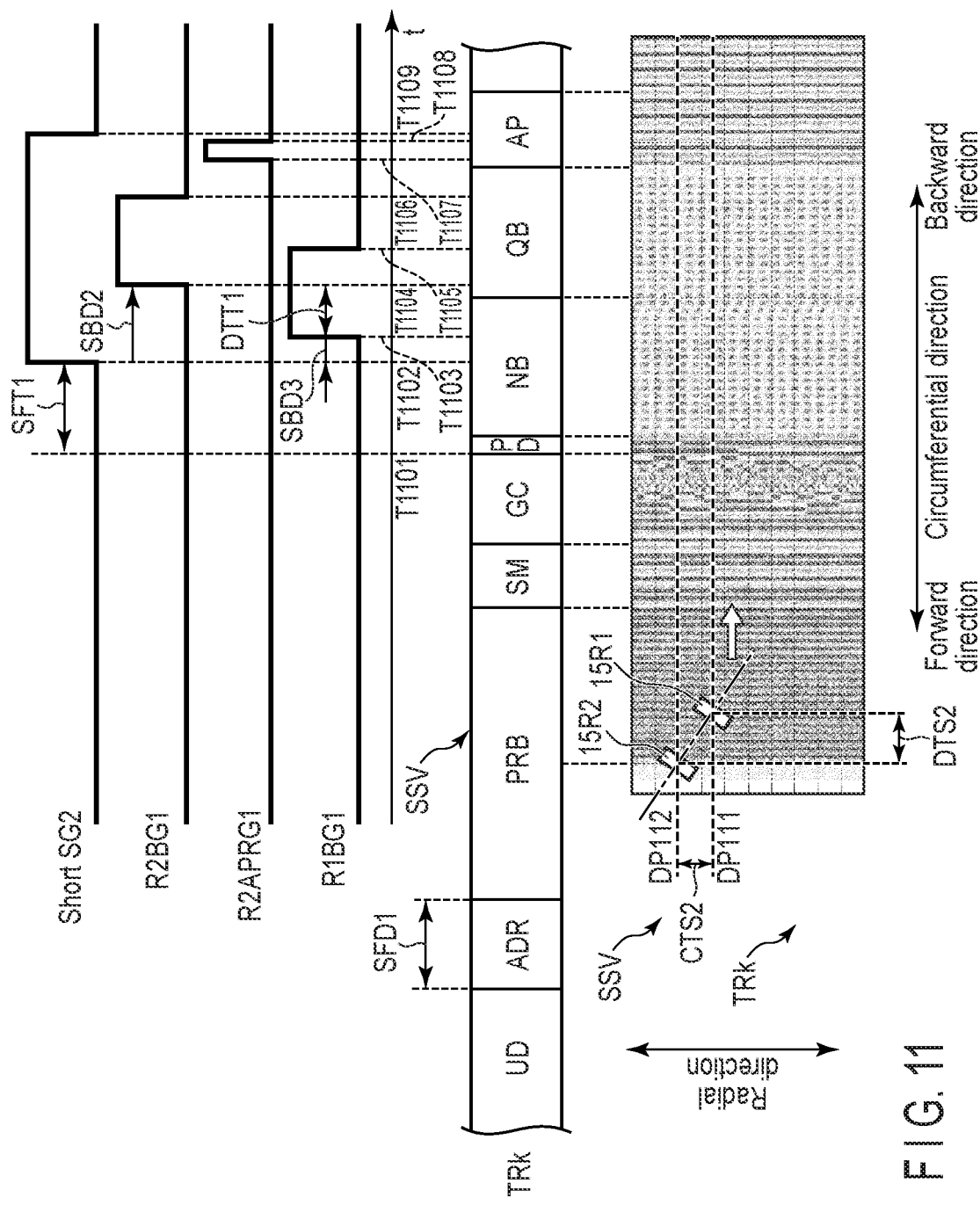
FIG. 11 is a schematic diagram illustrating an example of arrangement of various gates and heads for reading Q-burst data.

FIG. 11 is a schematic diagram illustrating an example of the arrangement of various gates and the head 15 for reading the Q-burst data QB. FIG. 11 illustrates the short SG2, the burst gate (R2BG) 1 that servo-reads burst, data using the read head 15R2, the additional pattern read gate (R2APRG) 1 that servo-reads an additional pattern using the read head 15R2, and the burst gate (R1BG) 1 that servo-reads burst data using the read head 15R1. The additional pattern read gate APRG can be used to detect whether the timing of reading the short servo data SSV is appropriate. These gates are asserted when rising and negated when failing. In FIG. 11, the horizontal axis of these gates expresses time t. The horizontal axis of FIG. 11 indicates timings T1101, T1102, T1103, T1104, T1105, T1106, T1107, T1108, and T1109. The timing T1102 corresponds to the time after the timing T1101, the timing T1103 corresponds to the time after the timing T1102, the timing T1104 corresponds to the time after the timing T1103, the timing T1105 corresponds to the time after the timing T1104, the timing T1106 corresponds to the time after the timing T1105, the timing T1107 corresponds to the time after the timing T1106, the timing T1108 corresponds to the time after the timing T1107, and the timing T1109 corresponds to the time after the timing T1108. The timing T1101 corresponds to a timing at which the PAD PD (N-burst data NB) is read, the timing T1102 corresponds to a timing at which the short SG2 is asserted, the timing T1103 corresponds to a timing at which the R1BG1 is asserted, the timing T1104 corresponds to a timing at which the R2BG1 is asserted, the timing T1105 corresponds to a timing at which the R1BG1 is negated, the timing T1106 corresponds to a timing at which the R2BG1 is negated, the timing T1107 corresponds to a timing at which the R2APRG1 is asserted, the timing T1108 corresponds to a timing at which the R2APRG1 is negated, and the timing T1109 corresponds to a timing at which the short SG2 is negated.

The difference value between the timing T1101 and the timing T1102 corresponds to time (in the following, sometimes referred to as a shift time) SFT1 for shifting the timing for servo-reading of the N-burst data NB to the timing for servo-reading of the Q-burst data QB. The difference value between the timing T1102 and the timing T1104 corresponds to the short assertion time SBD2 from the assertion of the short SG2 to the assertion of R2BG1. The difference value between the timing T1102 and the timing T1103 corresponds to the short assertion time SBD3 from the assertion of the short SG2 the assertion of the R1BG1 is asserted. The short assertion time SBD3 is, for example, (the short assertion time SBD2)–(a time DTT1 corresponding to a down track separation DTS2) (in the following, sometimes referred to as a down track time). For example, the down track time is measured for each head, each zone, and each track as a difference between the detection time of the servo mark SM using the read head 15R1 and the detection time of the servo mark SM using the read head 15R2, and can be recorded as a table in a particular recording region, for example, the nonvolatile memory 80 or the system area 10b of the disk 10.

FIG. 11 illustrates the track TRk. The track TRk has user data UD and short servo data SSV. The user data UD includes an extension region ADR. The extension region ADR corresponds to a range of the user data UD that can be extended by changing from the short servo gate for servo-reading from the N-burst data NB to the short servo gate for serve-reading from the Q-burst data QB. A length SFD1 of the extension region ADR corresponds to the shift time SFT1. The short servo data SSV includes a preamble PRB, a servo mark SM, a gray code GC, a PAD PC, N-burst data NB, Q-burst data QB, and an additional pattern AP. FIG. 11 illustrates servo patterns corresponding to the preamble PRB, the servo mark SM, the gray code GC, the PAD PD, the N-burst data NB, and the Q-burst data QB.

FIG. 11 illustrates the read head 15R1 and the read head 15R2. In FIG. 11, the read head 15R1 is disposed at a radial position DP111, and the read head 15R2 is disposed at a radial position DP112. In the example illustrated in FIG. 11, a cross track separation CTS2 between the read head 15R1 and the read head 15R2 and the down track separation DTS2 between the read head 15R1 and the read head 15R2 are illustrated. In FIG. 11, the read head 15R2 will be described as a reference read head. In the example illustrated in FIG. 11, the read head 15R2 is located in the PAD PD at the timing T1101, located in the N-burst data NB at the timing T1102, located in the Q-burst data QB at the timing T1104, located in the Q-burst data Q3 at the timing T1106, located in the additional pattern AP at the timing T1107, located in the additional pattern AP at the timing T1108, and located in the additional pattern AP at the timing T1109. In the example illustrated in FIG. 11, the read head 15R1 is located at a position advanced by DTT1 from the read head 15R2, and located in the Q-burst data QB in the case in which the read head 15R2 is at the timing T1103, and located in the Q-burst data QB in the case in which the read head 15R2 is at the timing T1105.

In the case in which the servo read processing is executed in response to the short SG2, the system controller 130 asserts the short SG2 at the timing T1102, and starts the servo read processing. The system controller 130 asserts R1BG1 for reading the Q-burst data QB using the read head 15R1 at the timing T1103 after the short assertion time SBD3 from the timing T1102 in the case in which the short SG2 is asserted, and negates R1BG1 at the timing T1105. The system controller 130 asserts R2BG1 for reading the Q-burst data QB using the read head 15R2 at the timing T1104 after the short assertion time SBD2 from the timing T1102 when the short SG2 is asserted, completes the read processing of the Q-burst data QB using the read head 15R2 at the timing T1106, and negates R2BG1. The system controller 130 asserts the R2APRG1 for reading the additional pattern using the read head 15R2 at the timing T1107 and negates the R2APRG1 at the timing T1108. The system controller 130 negates the short SG2 at the timing T1109 and ends the servo read process.

FIG. 12 is a schematic diagram illustrating an example of arrangement of various gates and heads 15 for reading N-burst data NB and Q-burst data QB in Seek. FIG. 12 illustrates a normal SG1, a burst gate BG2, and an additional pattern read gate APRG2. In FIG. 12, the horizontal axis of these gates expresses time t. The horizontal axis of FIG. 12 indicates timings T1201, T1202, T1203, T1204, T1205, T1206, T1207, T1203, and T1209. The timing T1202 corresponds to the time after the timing T1201, the timing T1203 corresponds to the time after the timing T1202, the timing T1204 corresponds to the time after the timing T1203, the timing T1205 corresponds to the time after the timing T12G4, the timing T1206 corresponds to the time after the timing T1205, the timing T1207 corresponds to the time after the timing T1206, the timing T1203 corresponds to the time after the timing T1207, and the timing T1209 corresponds to the time after the timing T1208. The timing T1201 corresponds to a timing at which the normal SG1 is asserted, the timing T1202 corresponds to a timing at which the servo mark SM is read, the timing T1203 corresponds to a timing at which BG2 is asserted, the timing T1204 corresponds to a timing at which BG2 is negated, the timing T1205 corresponds to a timing at which BG2 is asserted, the timing T1206 corresponds to a timing at which BG2 is negated, the timing T1207 corresponds to a timing at which APRG2 is asserted, the timing T1208 corresponds to a timing at which APRG2 is negated, and the timing T1209 corresponds to a timing at which the normal SG1 is negated.

The difference value between timing T1202 and the timing T1203 corresponds to time (in the following, the normal assertion time may be referred to as a normal assertion time) NBD1 from the read (or detection) of the servo mark SM to the assertion of RG2.

FIG. 12 illustrates the track TRk. The track TRk has the short servo data SSV. The short servo data SSV includes a preamble PRB, a serve mark SM, a gray code GC, a PAD PD, N-burst data NB, Q-burst data QB, and an additional pattern AP. FIG. 12 illustrates servo patterns corresponding to the preamble PRB, the servo mark SM, the gray code GC, the PAD PD, the N-burst data NB, and the Q-burst data QB.

FIG. 12 illustrates the read head 15R1 and the read head 15R2. In FIG. 11, the read head 15R1 is disposed at a radial position DP121, and the read head 15R2 is disposed at a radial position DP122. In the example illustrated in FIG. 12, a cross track separation CTS3 between the read head 15R1 and the read head 15R2 and a down track separation DTS3 between the read head 15R1 and the read head 15R2 are illustrated. In FIG. 12, the read head 15R2 will be described as a reference read head. In the example illustrated in FIG. 12, the read head 15R2 is located in the preamble PRB at the timing T1201, located in the servo mark SM at the timing T1202, located in the N-burst data NB at the timing T1203, located in the N-burst data NB at the timing T1204, located in the Q-burst data QB at the timing T1205, located in the Q-burst data QB at the timing T1206, located in the additional pattern AP at the timing T1207, located in the additional pattern AP at the timing T1208, and located in the additional pattern AP at the timing T1209.

In the case in which the servo read processing is executed according to the normal SG1 in Seek, the system controller 130 asserts the normal SG1 at the timing T1201 and starts the servo read processing. The system controller 130 asserts BG2 at the timing T1203 after the normal assertion time NBD1 from the timing T1202 at which the servo mark SM is detected, negates BG2 at the timing T1204, asserts BG2 at the timing T1205, and negates BG2 at the timing T1206. The system controller 130 asserts the APRG2 at the timing T1207 and negates the APRG2 at the timing T1208. The system controller 130 negates the normal SG1 at the timing T1209 and ends the servo read process.

Figure 13:
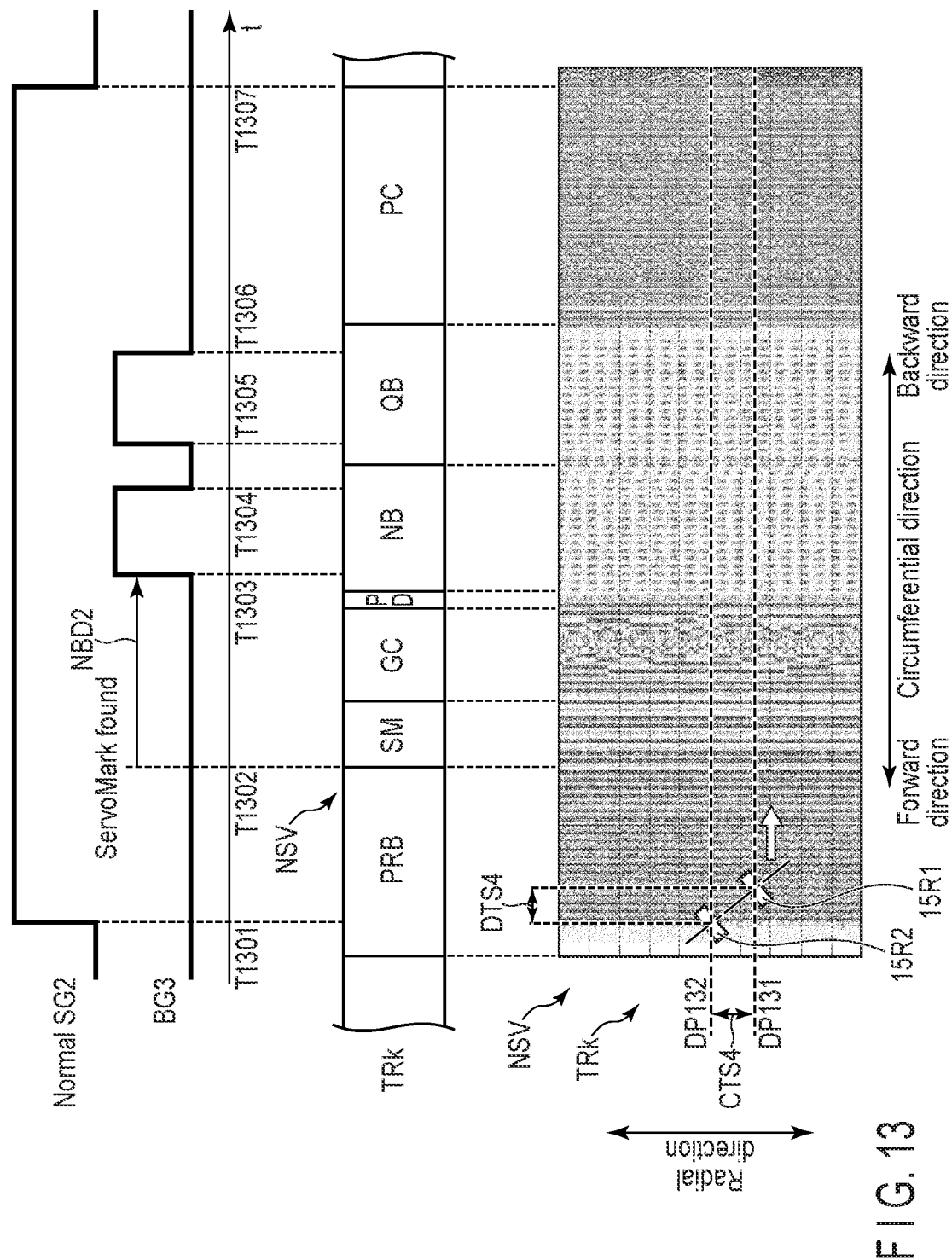
FIG. 13 is a schematic diagram illustrating an example of arrangement of various gates and heads for reading N-burst data and Q-burst data.

FIG. 13 is a schematic diagram illustrating an example of the arrangement, of various gates and the head 15 for reading the N-burst data NB and the Q-burst data QB. FIG. 13 illustrates a normal SG2 and a burst gate BG3. In FIG. 13, the horizontal axis of these gates expresses time t. The horizontal axis of FIG. 13 indicates timings T1301, T1302, T1303, T1304, T1305, T1306, and T1307. The timing T1302 corresponds to the time after the timing T1301, the timing T1303 corresponds to the time after the timing T1302, the timing T1304 corresponds to the time after the timing T1303, the timing T1305 corresponds to the time after the timing T1304, the timing T1306 corresponds to the time after the timing T1305, and the timing T1307 corresponds to the time after the timing T1306. The timing T1301 corresponds to a timing at which the normal SG2 is asserted, the timing T1302 corresponds to a timing at which the servo mark SM is read, the timing T1303 corresponds to a timing at which the BG3 is asserted, the timing T1304 corresponds to a timing at which the BG3 is negated, the timing T1305 corresponds to a timing at which the BG3 is asserted, the timing T1306 corresponds to a timing at which the BG3 is negated, and the timing T1307 corresponds to a timing at which the normal SG2 is negated.

The difference value between the timing T1302 and the timing T1303 corresponds to the normal assertion time NBD2.

FIG. 13 illustrates the track TRk. The track TRk has normal servo data NSV. The normal servo data NSV includes a preamble PRB, a serve mark SM, a gray code GC, a PAD PD, N-burst data NB, Q-burst data QB, and a post code PC. FIG. 13 illustrates servo patterns corresponding to the preamble PRB, the servo mark SM, the gray code GC, the PAD PD, the N-burst data NB, the Q-burst data QB, and the post code PC.

FIG. 13 illustrates the read head 15R1 and the read head 15R2. In FIG. 13, the read head 15R1 is disposed at a radial position DP131, and the read head 15R2 is disposed at a radial position DP132. In the example illustrated in FIG. 13, a cross track separation CTS4 between the read head 15R1 and the read head 15R2 and a down track separation DTS4 between the read head 15R1 and the read head 15R2 are illustrated. In FIG. 13, the read head 15R2 will be described as a reference read head. In the example illustrated in FIG. 13, the read head 15R2 is located in the preamble PRB at the timing T1301, located in the serve mark SM at the timing T1302, located in the N-burst data NB at the timing T1303, located in the N-burst data NB at the timing T1304, located in the Q-burst data QB at the timing T1305, located in the Q-burst data QB at the timing T1306, and located in the post code PC at the timing T1307.

In the case in which the servo read processing is executed according to the normal SG2, the system controller 130 asserts the normal SG2 at the timing T1301 and starts the servo read processing. The system controller 130 asserts BG3 at the timing T1303 after the normal assertion time NBD2 from the timing T1302 at which the servo mark SM is detected, negates BG3 at the timing T1304, asserts BG3 at the timing T1305, and negates BG3 at the timing T1306. The system controller 130 negates the normal SG2 at the timing T1307 and ends the servo read process.

Figure 14:
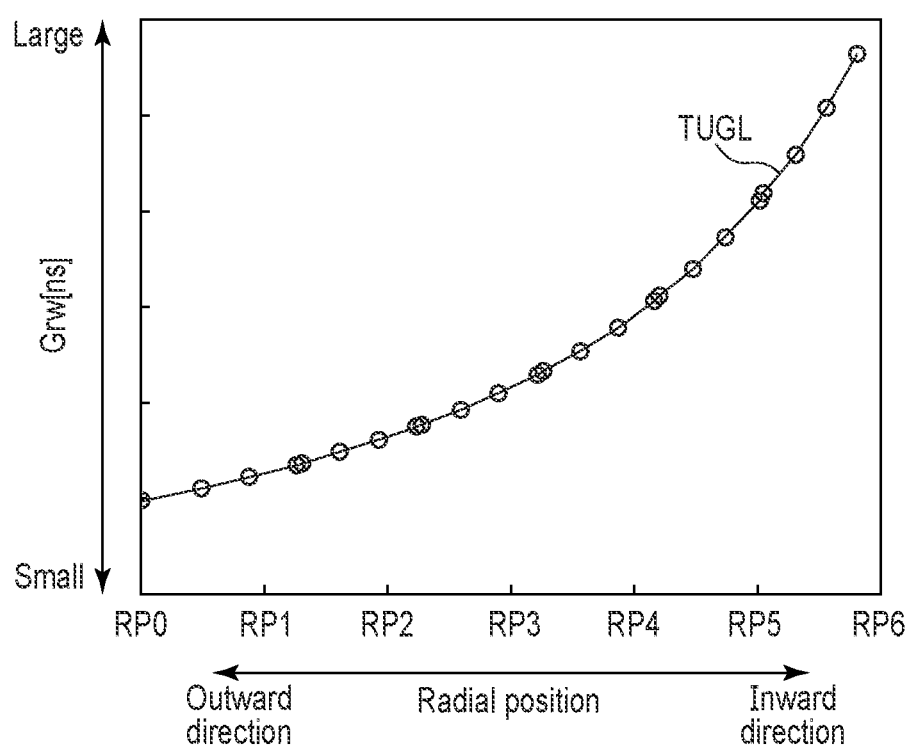
FIG. 14 is a diagram illustrating a change in a read/write gap in the time unit to a radial position.

FIG. 14 is a diagram illustrating a change in the read/write gap Grw in the time unit to the radial position. In FTG. 14, the horizontal axis indicates the radial position, and the vertical axis indicates the read/write gap Grw [ns] in the time unit. In the horizontal axis of FIG. 14, the radial position is located in the inward direction of the disk 10 as proceeding to the tip end side of the arrow in the inward direction, and located in the outward direction of the disk 10 as proceeding to the tip end side of the arrow in the outward direction. In the horizontal axis of FIG. 14, radial positions RP0, RP1, RP2, RP3, RP4, RP5, and RP6 are illustrated. The radial position RP1 is located inward from the radial position RP0, the radial position RP2 is located inward from the radial position RP1, the radial position RP3 is located inward from the radial position RP2, the radial position RP4 is located inward from the radial position RP3, the radial position RP5 is located inward from the radial position RP4, and the radial position RP6 is located inward from the radial position RP5. In the vertical axis of FIG. 14, the read/write gap Grw in the time unit, increases as it goes toward the tip end side of the large arrow and decreases as it goes toward the tip end side of the small arrow. FIG. 14 illustrates a change (in the following, sometimes simply referred to as a change in read/write gap in the time unit) TUGL of the read/write gap Grw in the time unit to the radial position.

The change TUGL in the read/write gap in the time unit decreases as the linear velocity increases toward the outward direction when the disk 10 rotates, and increases as the linear velocity decreases toward the inward direction when the disk 10 rotates. That is, for example, the read/write gap in the time unit in the case in which the head 15 is disposed in the outer circumferential region CR of the disk 10 is smaller than the read/write gap in the time unit in the case in which the head 15 is disposed in the middle circumferential region MR of the disk 10. For example, the read/write gap in the time unit in the case in which the head 15 is disposed in the inner circumferential region IR of the disk 10 is larger than the read/write gap in the time unit in the case in which the head 15 is disposed in the middle circumferential region MR of the disk 10.

FIG. 15 is a diagram illustrating a change in the read/write gap Grw converted into the dibit length to the radial position. In FIG. 15, the horizontal axis expresses the radial position, and the vertical axis expresses the read/write gap Grw [dibit] in the dibit length. In the horizontal axis of FIG. 15, the radial position is located in the inward direction of the disk 10 as proceeding to the tip end side of the arrow in the inward direction, and located in the outward direction of the disk 10 as proceeding to the tip end side of the arrow in the outward direction. In the horizontal axis of FIG. 15, radial positions RP0, RP1, RP2, RP3, RP4, RP5, RP6, RP12, RP23, RP34, RP45, and RP56 are illustrated. In FIG. 15, the radial position RP12 corresponds to a position between the radial positions RP1 and RP2, the radial position RP23 corresponds to a position between the radial positions RP2 and RP3, the radial position RP34 corresponds to a position between the radial positions RP3 and RP4, the radial position RP45 corresponds to a position between the radial positions RP4 and RP5, and the radial position RP56 corresponds to a position between the radial positions RP5 and RP6. In the vertical axis of FIG. 15, the read/write gap Grw in the dibit length increases toward the tip end side of the large arrow and decreases toward the tip end side of the small arrow. The vertical axis in FIG. 15 indicates a threshold (read/write gap threshold) th1. FIG. 15 illustrates a change (in the following, sometimes simply referred to as a change in the read/write gap Grw in the dibit length) DUGL of the read/write gap Grw in the dibit length to the radial position. The read/write gap Grw in the dibit length is acquired in which the read/write gap Grw in the time unit is divided by the length in the time unit of one servo data bit and the read/write gap Grw is converted into what servo data length (dibit length) the read/write gap Grw corresponds to. It should be noted that in PR23 and PR45 of FIG. 15, Grw is discontinuously changed, and this is because the servo frequency is changed in the zone servo format and the time of one dibit length is changed. FIG. 15 illustrates an example of the three-zone servo, and the number of zone servos may be divided into three or more.

In the case in which the read/write gap Grw is equal to or larger than the threshold value th1 when the head 15, for example, the read head 15R1 or 15R2 is disposed at a particular radial position, the system controller 130 servo-reads the burst data located in the backward direction in the burst data of the 3hort servo data SSV, for example, the Q-burst data QB using the read heads 15R1 and 15R2.

In the example illustrated in FIG. 15, in the case in which the head 15 is disposed in a range of the radial position RP12 or more and the radial position RP23 or less, a range of the radial position RP34 or more and the radial position RP45 or less, or a range of the radial position RF56 or more and the radial position RF6 or less, the system controller 130 servo-reads burst, data located in the backward direction in the burst data of the short servo data SSV, for example, the Q-burst data QB using the read heads 15R1. and 15R2.

FIG. 16 is a diagram illustrating a change CCL in the cross track separation to the radial position. In FIG. 16, the horizontal axis expresses a radial position, and the vertical axis expresses a cross track separation (CTS) [nm]. In the horizontal axis of FIG. 16, the radial position is located in the inward direction of the disk 10 as proceeding to the tip end side of the arrow in the inward direction, and located in the outward direction of the disk 10 as proceeding to the tip end side of the arrow in the outward direction. In the horizontal axis of FIG. 16, radial positions RP9, RP1, RP2, RP3, RP4, RP5, RP6, and RP7 are illustrated. In FIG. 16, the radial position RP7 is located inward from the radial position RP6. In the vertical axis of FIG. 16, the cross track separation increases to a positive value as proceeding to the tip end side of the positive arrow, and decreases to a negative value as proceeding to the tip end side of the negative arrow. In FIG. 16, the vertical axis expresses threshold values (cross track threshold values) th2 and −th2. FIG. 16 illustrates a change (in the following, sometimes simply referred to as a change in the cross track separation) CCL of the cross track separation to the radial position. The change CCL in the cross track separation is equal to or larger than the absolute value of the threshold th2 at the radial position RP2 or less and the radial position RP5 or more.

According to the examples illustrated in FIGS. 15 and 16, in the case in which the head 15 is disposed in the range from the radial position RP12 to the radial position RP2, or the range from the radial position RP56 to the radial position RP6, the system controller 130 servo-reads burst data located in the backward direction in the burst data of the short servo data SSV, for example, the Q-burst data QB using the read heads 15R1 and 15R2. It should be noted that in the case in which there are three or more read heads, three or more kinds of CTS can be taken at each radial position. A combination of read heads in which the CTS is equal to or larger than the absolute value of the threshold th2 is selected, and thus in a wider radial positron range, the burst data located in the backward direction in the burst data of the short servo data SSV, for example, the Q-burst data QB can be servo-read using the read heads 15R1 and 15R2.

FIG. 17 is a flowchart illustrating an example of a demodulation method for servo data according to the present embodiment.

The system controller 130 determines whether Seek is finished (B1701). Upon determining that Seek is not finished (NO in B1701), the system controller 130 goes to the process in B1706. Upon determining that Seek is ended (YES in B1701), the system controller 130 determines whether the read/write gap Grw is equal to or larger than the threshold th1 or smaller than the threshold th1 (B1702).

Upon determining that the read/write gap Grw is smaller than the threshold th1 (NO in B1702), the system controller 130 goes to the process in B1706. Upon determining that the read/write gap Grw is equal to or larger than the threshold th1 (YES in B1702), the system controller 130 determines whether the cross track separation (CTS) is equal to or larger than the threshold th2 or smaller than the threshold th2 (B1703).

Upon determining that the cross track separation is smaller than the threshold value th2 (NO in B1703), the system controller 130 goes to the process in B1706. Upon determining that the cross track separation is greater than or equal to the threshold th2 (YES in B1703), the system controller 130 determines whether the servo data is the short servo data SSV or not(B1704). For example, the system controller 130 determines whether the servo data is the short servo data SSV or the normal servo data NSV.

Upon determining that the servo data is not the short servo data SSV, for example, the normal servo data NSV (NO in B1704), the system controller 130 reads a plurality of pieces of burst data, for example, the N-burst data NB and the Q-burst data QB using the read head 15R1 or 15R2 (B1706), and ends the process.

Upon determining that the received data is the short servo data SSV, the system controller 130 reads the burst data located in the backward direction in the burst data in the plurality of read heads 15R, for example, the read heads 15R1 and 15R2, for example, the Q-burst data Q3 (B1705), and ends the process.

According to the present embodiment, the magnetic disk device 1 has the write head 15W and the plurality of read heads 15R (15R1 and 15R2). In the case in which the short servo data is serve-read under the conditions under which the read/write gap Grw is equal to or larger than the threshold th1 and the absolute value of cross track separation (CTS) is equal to or larger than the threshold th2, the magnetic disk device 1 reads burst data located in a backward direction in the burst data of the short servo data, for example, Q-burst data QB, using a plurality of read heads 15R, for example, read heads 15R1 and 15R2, and calculates a servo demodulation position. The short serve data SSV is read from the Q-burst data QB, and thus the magnetic disk device 1 can extend the region in which the user data is writable, compared with reading the short servo data SSV from the N-burst data NB. Accordingly, the magnetic disk device 1 can improve format efficiency.

Next, a magnetic disk device according to a modification will be described. In the modification, the same parts as those of the first embodiment described above are designated with the same reference numerals, and the detailed description is omitted.

(First Modification)

A magnetic disk device 1 according to a first modification is different from the magnetic disk device 1 according to the first embodiment described above in the configuration of the normal servo data NSV.

FIG. 18 is a schematic diagram illustrating an example of the configurations of normal serve data NSV and short servo data SSV according to the second embodiment. FIG. 18 illustrates particular normal servo data NSV and particular short servo data SSV written to a particular track TRn. FIG. 18 illustrates the length ASL2 of the normal servo data NSV. The length ASL2 of the normal servo data NSV is shorter than the length ASL1 of the normal servo data NSV.

The burst data includes, for example, N-burst (N Burst) data NB alone. The post code PC of the normal servo data NSV may be data in which the Q-burst data QB is overwritten. For example, in the Postcode Write process or the like, the post cede PC is overwritten with the Q-burst data QB.

Figure 19:
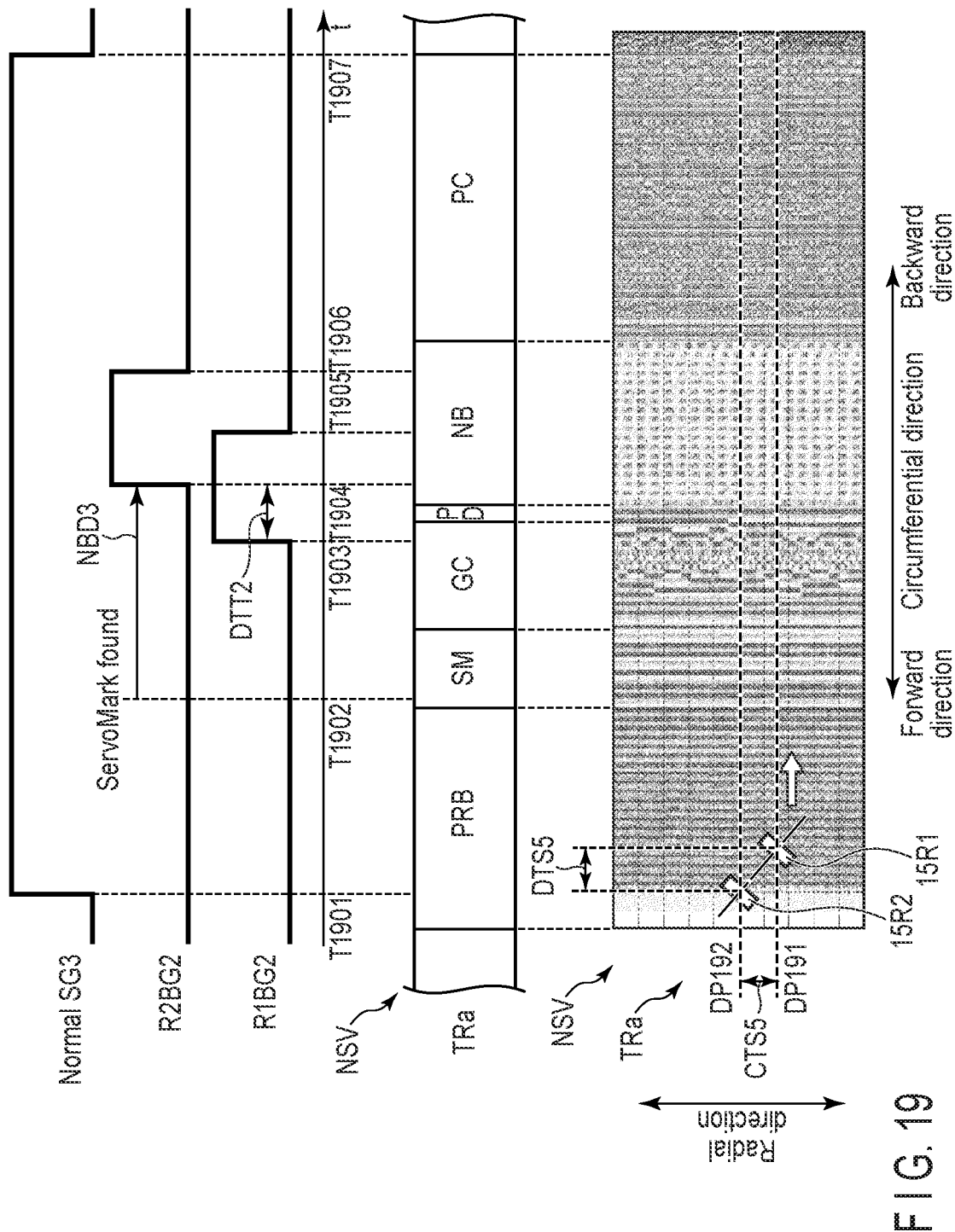
FIG. 19 is a schematic diagram illustrating an example of arrangement of various gates and heads for reading N-burst data.

FIG. 19 is a schematic diagram illustrating an example of arrangement of various gates and heads 15 for reading N-burst data NB. FIG. 19 illustrates a normal SG3, a burst gate (R2RG) 2 that servo-reads burst data using the read head 15R2, and a burst gate (R1BG) 2 that servo-reads burst data using the read head 15F1. In FIG. 19, the horizontal axis of these gates expresses time t. The horizontal axis of FIG. 19 indicates timings T1901, T1902, T1903, T1904, T1905, T1906, and T1907. The timing T1902 corresponds to the time after the timing T1901, the timing T1903 corresponds to the time after the timing T1902, the timing T1904 corresponds to the time after the timing T1903, the timing T1905 corresponds to the time after the timing T1904, the timing T1906 corresponds to the time after the timing T1905, and the timing T1907 corresponds to the time after the timing T1906. The timing T1901 corresponds to a timing at which the normal SG3 is asserted, the timing T1902 corresponds to a timing at which the servo mark SM is read, the timing T1903 corresponds to a timing at which R1BG2 is asserted, the timing T1904 corresponds to a timing at which R2BG2 is asserted, the timing T1905 corresponds to a timing at which R1BG2 is negated, the timing T1906 corresponds to a timing at which R2BG2 is negated, and the timing T1907 corresponds to a timing at which the normal SG3 is negated.

The difference value between the timing T1902 and the timing T1904 corresponds to the normal assertion time NBD3. The difference value between the timing T1903 and the timing T1904 corresponds to a down track time DTT2 corresponding to a down track separation DTS5.

FIG. 19 illustrates a track TRa. The track TRa has normal servo data NSV. The normal servo data NSV includes a preamble PRB, a servo mark SM, a gray code GC, a PAD PD, N-burst data NB, and a post code PC. FIG. 19 illustrates servo patterns corresponding to the preamble PRB, the servo mark SM, the gray code GC, the PAD PD, the N-burst data NB, and the post code PC.

FIG. 19 illustrates the read head 15RL and the read head 15R2. In FIG. 19, the read head 15R1 is disposed at a radial position DP191, and the read head 15R2 is disposed at a radial position DP192. In the example illustrated in FIG. 19, a cross track separation CTS5 between the read head 15R1 and the read head 15R2 and a down track separation DTS5 between the read head 15R1 and the read head 15R2 are illustrated. In FIG. 19, the read head 15R2 will be described as a reference read head. In the example illustrated in FIG. 19, the read head 15R2 is located in the preamble PRB at the timing T1901, located in the servo mark SM at the timing T1902, located in the N-burst data NB at the timing T1904, located in the N-burst data NB at the timing T1906, and located in the post code PC at the timing T1907. In the example illustrated in FIG. 19, the read head 15R1 is located at a position advanced by DTT2 to the read head 15R2, and located in the N-burst data NB in the case in which the read head 15R2 is at the timing T1903, and located in the N-burst data NB in the case in which the read head 15R2 is at the timing T1905.

In the case in which the servo read processing is executed according to the normal SG3, the system controller 130 asserts the normal SG3 at the timing T1901 and starts the servo read processing. The system controller 130 asserts R2BG2 for reading the N-burst data NB using the read head 15R2 at the timing T1904 after the normal assertion time NBD3 from the timing T1902 at which the servo mark SM is detected, and negates R2BC2 at the timing T1906. The system controller 130 asserts R1BG2 for reading the N-burst data NB using the read head 15R1 at the timing T1903 shifted from the timing T1904 by the down track time DTT2 in the forward direction, and negates R1BG2 for reading the N-burst data NB using the read head 15R1 at the timing T1905. The system controller 130 negates the normal SG3 at the timing T1907 and ends the servo read process.

Figure 20:
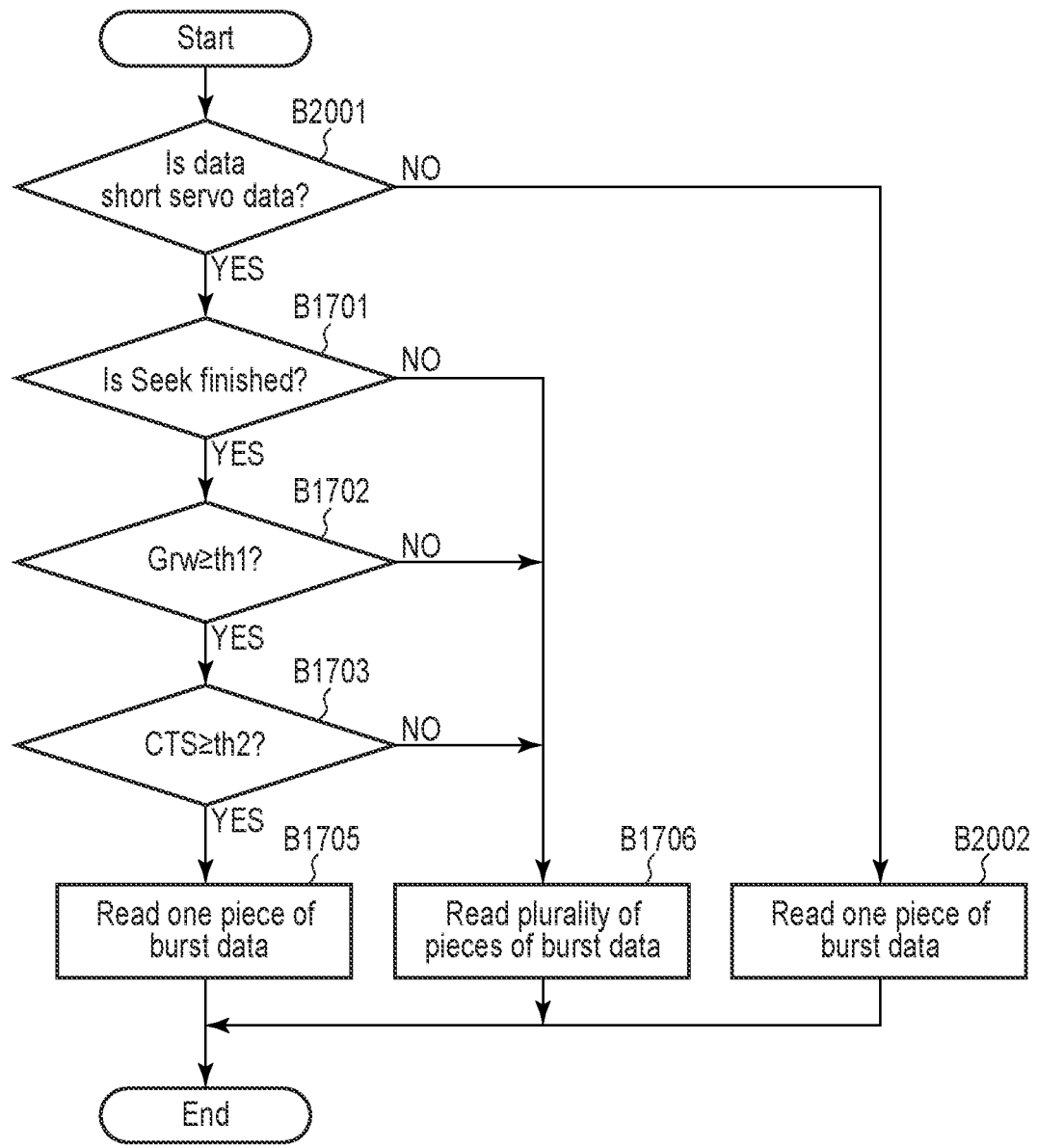
FIG. 20 is a flowchart illustrating an example of a demodulation method for servo data according to a first modification.

FIG. 20 is a flowchart, illustrating an example of a demodulation method for servo data according to the first modification.

The system controller 130 determines whether the servo data SSV is the short servo data SSV (B2001). For example, the system controller 130 determines whether the servo data is the short servo data SSV or the normal servo data NSV.

Upon determining that the received data is not the short servo data SSV, for example, the normal servo data NSV (NO in B2001), the system controller 130 reads one burst data in the burst data, for example, the N-burst data NB, by the plurality of read heads 15R, for example, the read heads 15R1 and 15R2 (B2002), and ends the process.

Upon determining that the servo data SSV is the short servo data SSV, the system controller 130 determines whether Seek is ended (B1701). Upon determining that Seek is not finished (NO in B1701), the system controller 130 goes to the process in B1706. Upon determining that Seek is ended (YES in B1701), the system controller 130 determines whether the read/write gap Grw is equal to or larger than the threshold th1 or smaller than the threshold th1 (B1702).

Upon determining that the read/write gap Grw is smaller than the threshold th1 (NO in B1702), the system controller 130 goes to the process in B1706. Upon determining that the read/write gap Grw is equal to or larger than the threshold th1 (YES in B1702), the system controller 130 determines whether the cross track separation (CTS) is equal to or larger than the threshold th2 or smaller than the threshold th2 (B1703).

Upon determining that the cross track separation is smaller than the threshold value th2 (NO in B1703), the system controller 130 roads a plurality of pieces of burst data, for example, N-burst data NB and Q-burst data QB using the read head 15R1 or 15R2 (B1706), and ends the process.

Upon determining that the cross track separation is the threshold th2 or more (YES in B1703), the system controller 130 reads the burst data located in the backward direction in the burst data, for example, the Q-burst data QB in the plurality of read heads 15R, for example, using the read heads 15R1 and 15R2 (B1705), and ends the process.

According to the first modification, in the case in which servo-reading is performed on the normal servo data NSV including only the N-burst data NB as the burst data, the magnetic disk device 1 reads one burst data in the burst data, for example, the N-burst data NB, by the plurality of read heads 15R, for example, the read heads 15R1 and 15R2, and calculates the servo demodulation position. Accordingly, the magnetic disk device 1 can improve format efficiency.

(Second Modification)

The magnetic disk device 1 according to the second modification is different from the magnetic disk device 1 according to the first embodiment described above in the configuration of the short servo data SSV.

FIG. 21 is a schematic diagram illustrating an example of the configurations or normal serve data NSV and short servo data SSV according to the second modification. FIG. 21 illustrates particular normal servo data NSV and particular short servo data SSV (SSV1, SSV2) written to a particular track TRn. In the particular track TRn, data is written from the forward direction in the circumferential direction to the backward direction opposite to the forward direction. For example, the forward direction corresponds to a temporally or physically forward direction in the circumferential direction, and the backward direction corresponds to a temporally or physically backward direction in the circumferential direction. FIG. 21 illustrates a length ASL2 of the normal servo data NSV, a length STL1 of the short servo data SSV1, and a length STL2 of the short servo data SSV2. The length STL2 of the short servo data SSV2 is shorter than the length STL1 of the short servo data SSV1.

The short serve data SSV includes short serve data SSV1 and SSV2. The short servo data SSV1 is equivalent to the short servo data SSV illustrated in FIG. 3. The short servo data SSV2 includes, for example, only N-burst data NB as burst data. The Additional Pattern AP of the short servo data SSV2 may be data in which the Q-burst data QB is overwritten. For example, in the PostCode Write process or the like, the Additional Pattern AP is overwritten with the Q-burst data QB.

FIG. 22 is a flowchart illustrating an example of a demodulation method for servo data according to the second modification.

The system controller 130 determines whether the servo data SSV is the short servo data SSV (B2001). For example, the system controller 130 determines whether the servo data is the short servo data SSV or the normal servo data NSV.

Upon determining that the received data is net the short servo data SSV, for example, is the normal servo data NSV (NO in B2001), the system controller 130 reads one burst data in the burst data, for example, the N-burst data NB, by the plurality of read heads 15R, for example, the read heads 15R1 and 15R2 (B2201), and ends the process.

Upon determining that the servo data SSV is the short servo data SSV, the system controller 130 determines whether Seek is ended (B1701). Upon determining that Seek is not finished (NO in B1701), the system controller 130 goes to the process in B2201. Upon determining that Seek is ended (YES in B1701), the system controller 130 determines whether the read/write gap Grw is equal to or larger than the threshold th1 or smaller than the threshold th1 (B1702).

Upon determining that the read/write gap Grw is smaller than the threshold th1 (NO in B1702), the system controller 130 goes to the process in B2201. Upon determining that the read/write gap Grw is equal to or larger than the threshold th1 (YES in R1702), the system controller 130 determines whether the cross track separation (CTS) is equal to or larger than the threshold th2 or smaller than the threshold th2 (B1703).

Upon determining that the cross track separation is smaller than the threshold value th2 (NO in B1703), the system controller 130 goes to the process in B2201 and ends the process.

Upon determining that the cross track separation is the threshold th2 or more (YES in B1703), the system controller 130 reads the burst data located in the backward direction in the burst data, for example, the Q-burst data 23 in the plurality of read heads 15R, for example, using the read heads 15R1 and 15R2 (B1705), and ends the process.

According to the second modification, in the case in which the short servo data SSV2 including only the N-burst data NB as the burst data is servo-read, the magnetic disk device 1 reads one burst data in the burst data, for example, the N-burst data NB, by the plurality of read heads 15R, for example, the read heads 15R1 and 15R2, and calculates the servo demodulation position. Accordingly, the magnetic disk device 1 can improve format efficiency.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a disk having first servo data in a short servo sector different from a normal servo sector, the first servo data including a first preamble, a first servo mark, a first gray code, first burst data, and second burst data written after the first burst data and different from the first burst data;
a head including a write head that writes data to the disk and a first read head and a second read head that read data from the disk; and
a controller that reads the second burst data using the first read head and the second read head and calculates a servo demodulation position when the first servo data is servo-read without reading the first burst data in a short servo mode in which the first preamble, the first servo mark, and the first gray code are not read.

2. The magnetic disk device according to claim 1, wherein when a first distance between the write head and the first read head in a circumferential direction of the disk is a first threshold or more, the controller reads the first servo data without reading the first burst data in the short servo mode, and reads the second burst data using the first read head and the second read head to calculate a servo demodulation position.

3. The magnetic disk device according to claim 2, wherein when a second distance between the first read head and the second read head in a radial direction of the disk is a second threshold or more, the controller reads the first servo data without reading the first burst data in the short servo mode, and reads the second burst data using the first read head and the second read head to calculate a servo demodulation position.

4. The magnetic disk device according to claim 2, wherein when the first distance is smaller than the first threshold, the controller reads the first servo data in the short servo mode, and reads the first burst data and the second burst data using the first read head or the second read head to calculate a servo demodulation position.

5. The magnetic disk device according to claim 3, wherein when the second distance is smaller than the second threshold, the controller reads the first servo data in the short servo mode, and reads the first burst data and the second burst data using the first read head or the second read head to calculate a servo demodulation position.

6. The magnetic disk device according to claim 1, wherein the first burst data and the second burst data are written in a data pattern in which a first phase of the first burst data are inverted by 180° at one servo track cycle in a radial direction of the disk, and a second phase of the second burst data are inverted by 180° at one servo track cycle in the radial direction of the disk, and a first burst track center position of the first burst data and a second burst track center position of the second burst data are shifted from each other in the radial direction of the disk.

7. The magnetic disk device according to claim 6, wherein the first burst track center position of the first burst data and the second burst track center position of the second burst data are shifted from each other by 0.5 servo track in the radial direction of the disk.

8. The magnetic disk device according to claim 1, wherein the disk has second servo data in the normal servo sector, the second servo data including a second preamble, a second servo mark, a second gray code, third burst data, and fourth burst data written after the third burst data and different from the third burst data, and
the controller reads the third burst data and the fourth burst data using the first read head or the second read head to calculate a servo demodulation position when the second servo data is servo-read in a normal servo mode in which the second preamble, the second servo mark, and the second gray code are read.

9. The magnetic disk device according to claim 1, wherein the disk has second servo data in the normal servo sector, the second servo data including a second preamble, a second servo mark, a second gray code, and third burst data, and
the controller reads the third burst data using the first read head and the second read head to calculate a servo demodulation position when the second servo data is servo-read in a normal servo mode in which the second preamble, the second servo mark, and the second gray code are read.

10. The magnetic disk device according to claim 8, wherein
the third burst data and the fourth burst data are written in a data pattern in which a first phase of the third burst data are inverted by 180° at one servo track cycle in a radial direction of the disk, and a second phase of the fourth burst data are inverted by 180° at one servo track cycle in the radial direction of the disk, and a first burst track center position of the third burst data and a second burst track center position of the fourth burst data are shifted from each other in the radial direction of the disk.

11. The magnetic disk device according to claim 10, wherein
the first burst track center position of the third burst data and the second burst track center position of the fourth burst data are shifted from each other by 0.5 servo track in the radial direction of the disk.

12. The magnetic disk device according to claim 8, wherein the second servo data further has a post code.

13. A demodulation method for servo data applied to a magnetic disk device comprising a disk having first servo data in a short servo sector different from a normal servo sector, the first servo data including a first preamble, a first servo mark, a first gray code, first burst data, and second burst data written after the first burst data and different from the first burst data, and a head having a write head that writes data to the disk and a first read head and a second read head that read data from the disk, the method comprising
reading the second burst data using the first read head and the second read head to calculate a servo demodulation position when the first servo data is servo-read without reading the first burst data in a short servo mode in which the first preamble, the first servo mark, and the first gray code are not read.

14. The demodulation method for servo data according to claim 13, further comprising:
when a first distance between the write head and the first read head in a circumferential direction of the disk is a first threshold or more, reading the first servo data without reading the first burst data in the short servo mode; and
reading the second burst data using the first read head and the second read head to calculate a servo demodulation position.

15. The demodulation method for servo data according to claim 14, further comprising:
when a second distance between the first read head and the second read head in a radial direction of the disk is a second threshold or more, reading the first servo data without reading the first burst data in the short servo mode; and reading the second burst data using the first read head and the second read head to calculate a servo demodulation position.

16. The demodulation method for servo data according to claim 14, further comprising:

when the first distance is smaller than the first threshold, reading the first servo data in the short servo mode; and reading the first burst data and the second burst data using the first read head or the second read head to calculate a servo demodulation position.

17. The demodulation method for servo data according to claim 15, further comprising:

when the second distance is smaller than the second threshold, reading the first servo data in the short servo mode; and reading the first burst data and the second burst data using the first read head or the second read head to calculate a servo demodulation position.

18. The demodulation method for servo data according to claim 13, wherein the first burst data and the second burst data are written in a data pattern in which a first phase of the first burst data are inverted by 180° at one servo track cycle in a radial direction of the disk, and a second phase of the second burst data are inverted by 180° at one servo track cycle in the radial direction of the disk, and a first burst track center position of the first burst data and a second burst track center position of the second burst data are shifted from each other in the radial direction of the disk.

19. The demodulation method for servo data according to claim 18, wherein the first burst track center position of the first burst data and the second burst track center position of the second burst data are shifted from each other by 0.5 servo track in the radial direction of the disk.

20. The demodulation method for servo data according to claim 13, wherein the disk has second servo data in the normal servo sector, the second servo data including a second preamble, a second servo mark, a second gray code, third burst data, and fourth burst data written after the third burst data and different from the third burst data, and reading the third burst data and the fourth burst data using the first read head or the second read head to calculate a servo demodulation position when the second servo data is servo-read in a normal servo mode in which the second preamble, the second servo mark, and the second gray code are read.

21. The demodulation method for servo data according to claim 13, wherein the disk has second servo data in the normal servo sector, the second servo data including a second preamble, a second servo mark, a second gray code, and third burst data, and when the second servo data is servo-read in a normal servo mode in which the second preamble, the second servo mark, and the second gray code are read, the third burst data is read using the first read head and the second read head to calculate a servo demodulation position.

22. The demodulation method for servo data according to claim 20, wherein the third burst data and the fourth burst data are written in a data pattern in which a first phase of the third burst data are inverted by 180° at one servo track cycle in a radial direction of the disk, and a second phase of the fourth burst data are inverted by 180° at one servo track cycle in the radial direction of the disk, and a first burst track center position of the third burst data and a second burst track center position of the fourth burst data are shifted from each other in the radial direction of the disk.

23. The demodulation method for servo data according to claim 22, wherein the first burst track center position of the third burst data and the second burst track center position of the fourth burst data are shifted from each other by 0.5 servo track in the radial direction of the disk.

24. The demodulation method for servo data according to claim 20, wherein the second servo data further has a post code.

* * * * *